(12) United States Patent
Liu et al.

(10) Patent No.: US 9,362,829 B2
(45) Date of Patent: Jun. 7, 2016

(54) VOLTAGE REGULATION ASSOCIATED WITH A SWITCHING CONVERTER AND A SET OF LINEAR REGULATORS

(71) Applicant: The Hong Kong University of Science and Technology, Hong Kong (CN)

(72) Inventors: Yonggen Liu, Kowloon (HK); Chenchang Zhan, Kowloon (HK); Wing Hung Ki, Kowloon (HK)

(73) Assignee: THE HONG KONG UNIVERSITY OF SCIENCE AND TECHNOLOGY, Hong Kong (CN)

( * ) Notice: Subject to any disclaimer, the term of this patent is extended or adjusted under 35 U.S.C. 154(b) by 143 days.

(21) Appl. No.: 13/946,886

(22) Filed: Jul. 19, 2013

(65) Prior Publication Data

US 2014/0021930 A1   Jan. 23, 2014

Related U.S. Application Data

(60) Provisional application No. 61/741,455, filed on Jul. 20, 2012.

(51) Int. Cl.
*H02M 3/158* (2006.01)
*H02M 3/156* (2006.01)

(52) U.S. Cl.
CPC .......... *H02M 3/1584* (2013.01); *H02M 3/1588* (2013.01); *H02M 2003/1566* (2013.01)

(58) Field of Classification Search
CPC ............ H02M 3/1582; H02M 3/1584; H02M 2003/1566
USPC .................................................. 363/271, 281
See application file for complete search history.

(56) References Cited

U.S. PATENT DOCUMENTS

| | | | |
|---|---|---|---|
| 6,356,063 B1 * | 3/2002 | Brooks .......................... | 323/284 |
| 6,791,302 B2 * | 9/2004 | Tang .......................... | G05F 3/08 323/272 |
| 6,965,502 B2 * | 11/2005 | Duffy et al. ..................... | 361/18 |
| 8,129,953 B2 | 3/2012 | Pagano | |
| 8,830,644 B2 * | 9/2014 | Turchi ................. | H02M 3/1584 361/87 |
| 8,860,394 B2 * | 10/2014 | Houston ............... | H02M 3/156 323/285 |
| 2003/0006650 A1 * | 1/2003 | Tang et al. ...................... | 307/43 |
| 2007/0013356 A1 * | 1/2007 | Qiu et al. ....................... | 323/288 |

(Continued)

OTHER PUBLICATIONS

Zhang, X.; Huang, A.Q., "Impacts of transient voltage clamp on CPU power delivery," in Power Electronics Specialists Conference, 2004. PESC 04. 2004 IEEE 35th Annual , vol. 1, No., pp. 629-632 vol. 1, Jun. 20-25, 2004.*

(Continued)

*Primary Examiner* — Harry Behm
*Assistant Examiner* — Peter Novak
(74) *Attorney, Agent, or Firm* — Amin, Turocy & Watson, LLP

(57) ABSTRACT

Hybrid buck converters that incorporate switching converter and auxiliary linear regulators are described. The auxiliary linear regulators are automatically activated during load transients to source or sink large currents to the output to achieve fast transient responses and are automatically deactivated during steady states to maintain high power efficiencies. With the proposed control scheme of automatic loop transition between linear and switching regulation loops, the power management interface design is simplified while the transient response performances are improved without compromising the power efficiencies.

27 Claims, 18 Drawing Sheets

(56) References Cited

U.S. PATENT DOCUMENTS

2009/0115388 A1*  5/2009  Miyazaki et al. ............. 323/282
2012/0119720 A1*  5/2012  Li ................................. 323/284

OTHER PUBLICATIONS

R. A. R. van der Zee and E. A. J. M. van Tuijl, "A power-efficient audio amplifier combining switching and linear techniques," IEEE J. Solid-State Circ., vol. 34, No. 7, pp. 985-991, Jul. 1999.

W. Y. Chu, B. Bakkaloglu ad S. Kiaei, "A 10MHz bandwidth, 2 mV ripple PA regulator for CDMA transmitters," IEEE J. Solid-State Circ., vol. 43, No. 12, pp. 2809-2819, Dec. 2008.

R. Shrestha, R.van der Zee, A. de Graauw and B. Nauta, "A wideband supply modulator for 20 MHz RF bandwidth polar PAs in 65 nm CMOS," IEEE J. Solid-State Circ., vol. 44, No. 4, pp. 1272-1280, Apr. 2009.

Y. Wu and P. K. T. Mok, "A two-phase switching hybrid supply modulator for RF power amplifiers with 9% efficiency improvement," IEEE Int'l Solid-State Circ. Conf., pp. 196-197, Feb. 2010.

C. J. Shih, K. Y. Chu, Y. H. Lee and K. H. Chen, "Hybrid buck-linear (HBL) technique for enhanced dip voltage and transient response in load-preparation buck (LPB) converter," IEEE European Solid-State Circ. Conf., pp. 431-434, Sep. 2011.

* cited by examiner

VOLTAGE REGULATION ASSOCIATED WITH A SWITCHING CONVERTER AND A SET OF LINEAR REGULATORS

CROSS REFERENCE TO RELATED APPLICATION

This application claims priority to U.S. provisional application No. 61/741,455, filed on Jul. 20, 2012 and entitled: "Hybrid buck converters with automatic loop transition." The entirety of this provisional application is incorporated herein by reference.

TECHNICAL FIELD

This disclosure generally relates to voltage regulation in a device, e.g., to hybrid buck converters with automatic loop transitions to regulated voltage and related embodiments.

BACKGROUND

Power management integrated circuits manage power requirements for larger systems, such as cell phones, tablets, and other devices. Power management integrated circuits perform various functions related to the power requirements. Some common functions include DC to DC conversion, battery charging, power source selection, voltage scaling, frequency scaling, and power sequencing.

Power management integrated circuits include converters for voltage step-up/step down and for power factor correction. A parallel chopper or "boost" converter, converts DC-to-DC power with an output voltage greater than its input voltage. Boost converters contain at least two semiconductor switches (a diode and a transistor) and at least one energy storage element, a capacitor, inductor, or the two in combination. A series chopper or "buck" converter is a step-down DC to DC converter that reduces an input voltage from a power supply to a lower output voltage for use by a load. Its design is similar to the step-up boost converter, and like the boost converter, it is a switched-mode power supply that uses two switches (a transistor and a diode), an inductor and a capacitor.

Switching converters are indispensable components in battery-powered portable devices for their high efficiency. With more and more complicated and highly-integrated system-on-chip (SoC) designs, fast transient responses are crucial for switching converters to fit the demands of SoC. Hysteretic control provides fast response; however, complicated delay compensation scheme is required in order to fix the switching frequency to achieve a predictable noise spectrum.

On the other hand, pulse-width-modulation control has been attractive for its well predictable and manageable noise spectrum due to the fixed switching frequency. However, pulse-width-modulation control has limited loop bandwidth and low slew-rate of the inductor current and hence the transient response is very slow. The hybrid supply module, which consists of a parallel operation of switching converter and linear regulator, has the potential to be a successful combination of good power efficiency and high loop bandwidth. However, the existing hybrid control schemes either have poor efficiency, cannot be directly applied in a DC-DC converter, or do not target at fast transient response, or need a third party to inform the happening of load transients and hence have limited applicability.

The above-described background is merely intended to provide an overview of contextual information regarding power management integrated circuit devices, and is not intended to be exhaustive. Additional context may become apparent upon review of one or more of the various non-limiting embodiments of the following detailed description.

BRIEF DESCRIPTION OF THE DRAWINGS

Numerous aspects and embodiments are set forth in the following detailed description, taken in conjunction with the accompanying drawings, in which like reference characters refer to like parts throughout, and in which.

DETAILED DESCRIPTION

Figure 1:
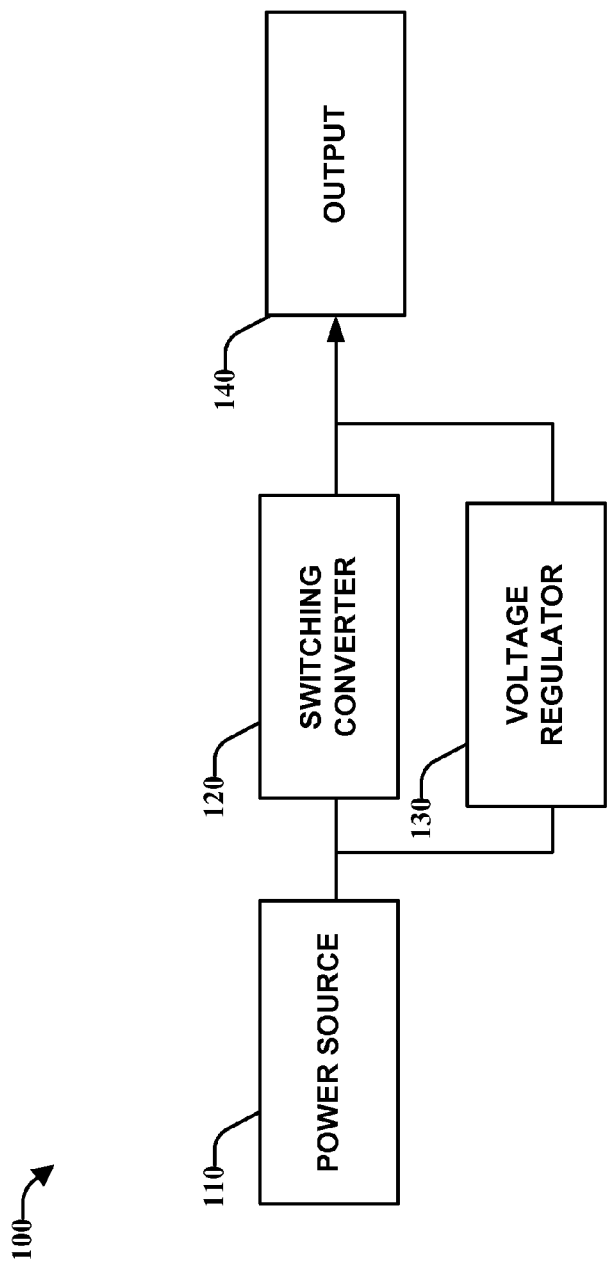
FIG. 1 is an example functional high level block diagram of a system that facilitates voltage management, according to an aspect or embodiment of the subject disclosure.

Various aspects or features of this disclosure are described with reference to the drawings, wherein like reference numerals are used to refer to like elements throughout. In this specification, numerous specific details are set forth in order to provide a thorough understanding of this disclosure. It should be understood, however, that the certain aspects of disclosure may be practiced without these specific details, or with other methods, components, molecules, etc. In other instances, well-known structures and devices are shown in block diagram form to facilitate description and illustration of the various embodiments. Additionally, elements in the drawing figures are not necessarily drawn to scale; some areas or elements may be expanded to help improve understanding of certain aspects or embodiments.

The subject application is generally related to a DC to DC converter with automatic loop transitions in a semiconductor device to provide a power management. The systems and methods can regulate a voltage to a predefined voltage level during load transient periods and can deactivate regulators during steady states.

The device can include a hybrid-buck converter with automatic loop transition. A buck converter can receive an input voltage and output an output voltage that is lower than the input voltage. The buck converter can provide voltage regulation utilizing switches that can generate an output voltage to a predefined voltage level. The device can include one or more regulators, such as linear regulators. A linear regulator can detect output overshoot voltage and/or output undershoot voltage. A linear regulator can provide source current to an output load when the regulator detects an undershoot voltage. In another aspect, a linear regulator can sink current when the regulator detects overshoot voltage.

As an example, hybrid buck converters are described to facilitate the understanding of the voltage control and loop transitions described herein. It is noted, however, that other semiconductor device can achieve voltage regulation and automatic loop transitions through the systems and methods described herein.

Various implementations described herein provide automatic loop transitions and voltage regulation. The implementations can provide increased efficiency of power management in a semiconductor device. It is noted that implementations can simplify power management semiconductor devices, while decreasing overall size, decreasing power consumption, increasing reliability, decreasing load transient performance time, and the like. It is further noted that the terms "buck converter", "single-phase buck converter", "multi-phase buck converter", "switching converter", and the like can refer to various devices and/or systems configured to perform DC to DC voltage conversion (e.g., step down). Unless otherwise stated or contexts suggests otherwise, the terms can be used interchangeably.

FIG. 1 is an example functional high level block diagram of a system 100 that facilitates voltage management of a semiconductor device. As described herein, the system 100 can be considered a hybrid buck converter. It is noted that the system 100 can be various other types of semiconductor device. While the various components are illustrated as separate components, it is noted that the various components can be comprised in one or more other components. Further, it is noted that the system 100 can comprise additional components not shown for readability. Additionally, the various components may be contained on one integrated circuit, or on a number of individual circuits coupled together. It is further noted that system 100 can be within larger system such as smart phones, tablets, e-readers, digital video recorders, mobile music players, personal computers, servers, memory sticks, digital video recorders (DVRs), consumer electronics and the like.

In implementations, system 100 can comprise a power source 110, a switching converter 120, a voltage regulator 130, and an output 140. The power source 110 can supply voltage to various components. In an aspect, the power source 110 can comprise a battery and/or other power supply.

Switching converter 120 can comprise circuitry for voltage conversion, such as DC to DC voltage step down. In an aspect the switching converter 120 can comprise buck converts, single-phase buck converters, multi-phase buck converters, and the like. In another aspect, the switching converter can generate an output 140 comprising a voltage.

Voltage regulator 130 can be configured to adjust a voltage based on the output 140. In an implementation, the voltage regulator 130 can determine whether or not the output 140 exceeds a predefined level above a reference voltage (e.g., overshoot voltage threshold). If the voltage regulator 130 determines that the output 140 exceeds a predefined level above a reference voltage the voltage regulator 130 can sink the output 140 to a predefined steady-state level.

In an aspect, the voltage regulator 130 can determine whether or not the output 140 has returned to a level satisfying a steady-state level, after being above a threshold level. If the voltage regulator 130 determines that the output 140 has returned to a level satisfying a steady-state level, the voltage regulator 130 can enter an off state thereby decreasing power consumption.

In various implementations, the voltage regulator 130 can determine whether or not the output 140 exceeds a predefined level below a reference voltage (e.g., undershoot voltage threshold). If the voltage regulator 130 determines that the output 140 exceeds a predefined level below a reference voltage, the voltage regulator 130 can source the output 140 to a predefined steady-state level.

In an another aspect, the voltage regulator 130 can determine whether or not the output 140 has returned to a level satisfying a steady-state level after being below a threshold level. If the voltage regulator 130 determines that the output 140 has returned to a level satisfying a steady-state level, the voltage regulator 130 can enter an off state thereby decreasing power consumption of system 100.

Figure 2:
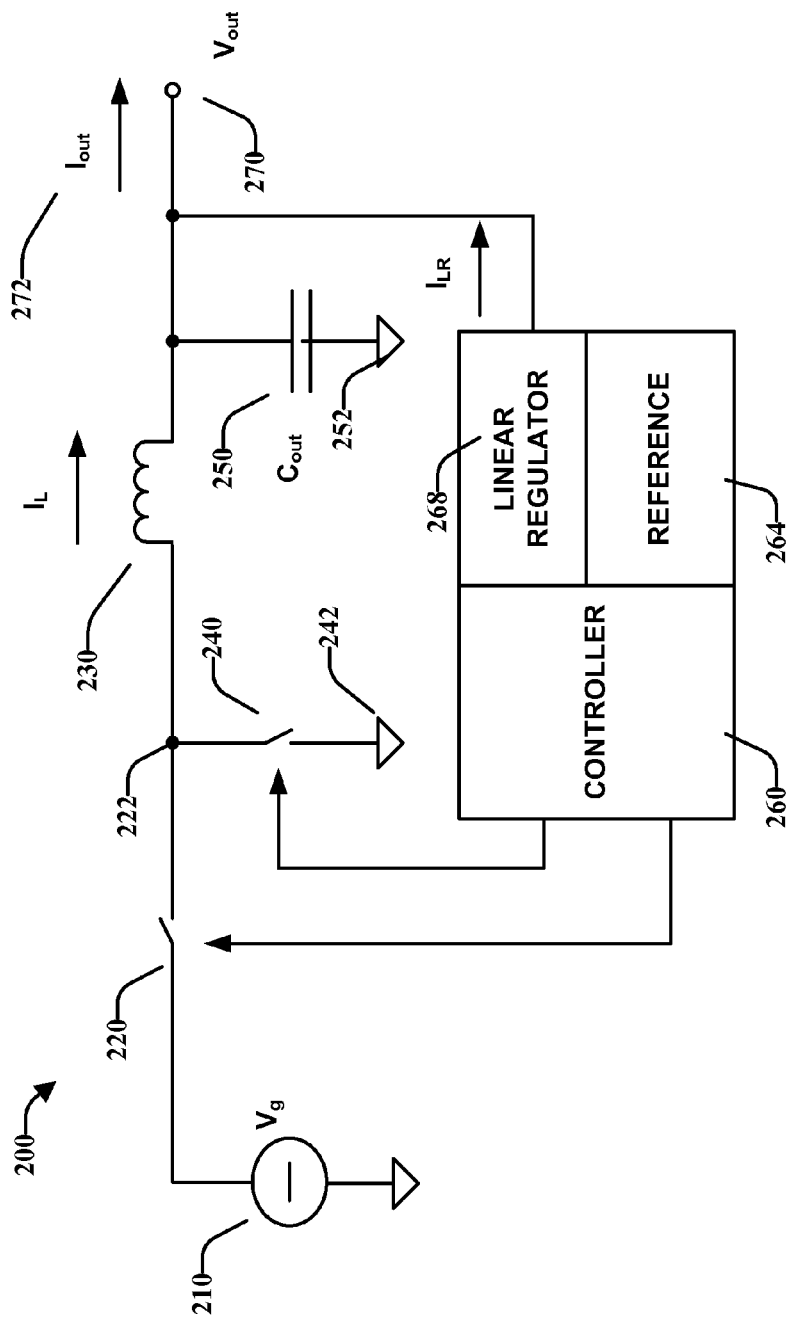
FIG. 2 is an example non-limiting schematic diagram of a system that facilitates automatic loop transitions including a single phase hybrid buck converter, according to an aspect or embodiment of the subject disclosure.

FIG. 2 is an example non-limiting schematic diagram of a system 200 that facilitates automatic loop transitions and voltage regulation. As described herein, the system 200 can be considered a single phase hybrid buck converter. It is noted that the system 200 can be various other types of semiconductor device. While the various components are illustrated as separate components, it is noted that the various components can be comprised in one or more other components. Further, it is noted that the system 200 can comprise additional components not shown for readability. Additionally, the various components can be contained on one integrated circuit, or on a number of individual circuits coupled together.

It is further noted that system 200 can be within larger system such as smart phones, tablets, e-readers, digital video recorders, mobile music players, personal computers, servers, memory sticks, digital video recorders (DVRs), consumer electronics and the like.

The system 200 includes an input 210 (e.g., $V_g$), a first switch 220 between input 210 and vertex 222, an inductor 230 coupled between vertex 222 (e.g., node) and an output terminal 252, a second switch 240 between vertex 222 and a ground 242, an output capacitor 250 coupled to the output terminal 252 or ground, a controller 260, a reference 264, a linear regulator(s) 268, and an output 270. Input 210 can comprise a voltage source providing a current to the system 200. In an aspect, input 210 can comprise a battery or other power source. For example, input 210 can correspond to a voltage supplied by an internal battery of a larger device, a wall power supply, a universal serial port power supply, and the like. The first switch 220 and the second switch 240 can represent a component that can complete an electrical circuit, break an electrical circuit, interrupt current, or divert current. It is noted that the first switch 220 and the second switch 240 can be coupled in series with a source of electric potential. In an aspect, the electrical potential can be between a positive supply and a ground, positive supply and a negative supply, different supply voltages of like polarity, and the like.

In an implementation, the controller 260 can control states of switches (on/off). In another aspect, the controller 260 can control first switch 220 and second switch 240 to accumulate a charge on the inductor 230. The controller 260 can deliver charge to the output 270 to regulate a predefined voltage (e.g., a DC voltage).

While depicted as switches with terminals that are either connected or disconnected from each other, it is noted that the first switch 220 and the second switch 240 can comprise single pole switches, bipolar transistors, metal-oxide-semiconductor field-effect transistor (MOSFET) transistors, diodes, and the like.

Linear regulator 268 can detect output overshoot voltage and/or output undershoot voltage. In another aspect, linear regulator 268 can provide source current to an output load when the linear regulator 268 detects an undershoot voltage. In another aspect, linear regulator 268 can sink current when the linear regulator 268 detects overshoot voltage. Linear regulator 268 can automatically deactivate at steady states and activate at transient states. It is noted that linear regulator 268 can comprise one or more auxiliary linear regulators, be constructed using bipolar transistors, MOSFET transistors, and/or the various other components.

In an implementation, linear regulator 268 can comprise two linear regulators. A first linear regulator of the linear regulator 268 can detect a predefined output undershoot voltage and sources current to the output 270 and/or the output capacitor 250. For example, an undershoot voltage can be caused by a large load current step-up and the first linear regulator of the linear regulator 268 can regulate the voltage back up to a predefined output. A second linear regulator of the linear regulator 268 detects a predefined output overshoot voltage and sinks current from the output 270 and/or output capacitor 250. For example, an overshoot voltage can be caused by a large load current step-down and the second linear regulator of the linear regulator 268 can regulate the voltage back down to a predefined output.

Reference 264 can comprise a voltage reference and/or a current reference. A voltage reference of reference 264 can comprise an electronic device that produces a fixed or constant voltage irrespective of a load on the reference 264, power supply variations, temperature changes, and the passage of time. Similarly, a current reference of reference 264 can comprise an electronic device that produces a fixed or constant current irrespective of a load on the reference 264, power supply variations, temperature changes, and the passage of time. Reference 264 can regulate parallel operation of switching and linear components of the system 200.

In implementations, the linear regulator 268 can detect voltage undershoot/overshoot based on a predefined tolerance level. For example, the linear regulator 268 can determine whether or not a voltage is within a threshold variance from a voltage reference of the reference 264. Likewise, linear regulator 268 can determine whether or not a current is within a threshold variance from a current reference of the reference 264. In an aspect, a threshold can be a predefined value, percentage, and/or dynamically determined.

Figure 3:
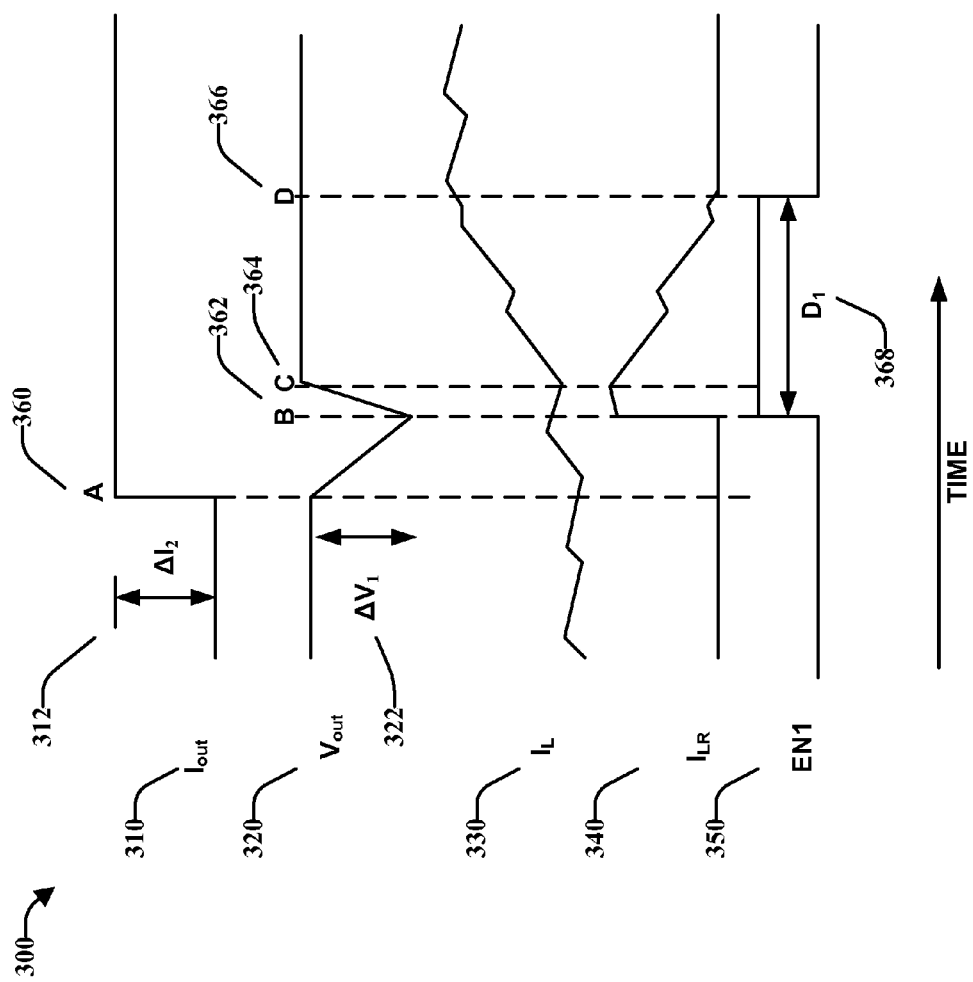
FIG. 3 is a timing diagram showing load transient responses in a load current step-up of a single-phase hybrid buck converter, according to an aspect or embodiment of the subject disclosure.

FIG. 3 is an example non-limiting timing diagram 300 of load transient responses of system 200 of FIG. 2. In an aspect, diagram 300 depicts timing of system 200 when the linear regulator 268 of FIG. 2 detects that the output 270 undershoots a predefined value.

Linear regulator 268 can determine whether or not the output 270 undershoots a predefined value. Diagram 300 depicts the output 270 as $V_{out}$ 320 and depicts the predefined value as $\Delta V_1$ 322 which steps down between a period from A 360 to B 362. In an aspect, the undershoot voltage can be caused by output current 272 of FIG. 2 step-up. For example, output current, represented as $I_{out}$ 310 can step up by a value of $\Delta I_1$ 312.

At or about B 362, linear regulator 268 is activated to source a current of $I_{LR}$ 340 to the loading to prevent the output 270 from further decreasing. For example, linear regulator 268 can provide a current, in the direction indicated, to the output 270. In an aspect, $I_{LR}$ 340 can represent a relatively large source current compared to a current $I_L$ 330 provided by the inductor 230. Additionally, at or about B 362, a duty ratio and hence current $I_L$ 330 generated by inductor 230 is increased to provide more charge to the loading. In an aspect, the output 270 can rise to a value defining a steady-state value. In an aspect, the value defining the steady-state value can be determined based on reference 264.

In another aspect, as inductor 230 increases current $I_L$ 330, the need for $I_{LR}$ 340 decreases as $I_L$ 330 and $I_{LR}$ 340 sum up to or approximately to the value of $I_{out}$ 310. For example, at or about C 364, $I_{LR}$ 340 begins to decrease as $I_L$ 330 begins to increase. After linear regulator 268 provides the initial large value of $I_{LR}$ 340, the linear regulator 268 can decrease the value of $I_{LR}$ 340. In another aspect, the linear regulator 268 can determine whether or not the value of $I_{LR}$ 340 is decreased to a predefined value (e.g., inductor 230 produces a large enough current to support the loading). When the linear regulator 268 can determine the value of $I_{LR}$ 340 is decreased to the predefined value, the linear regulator 268 can deactivate at or about D 366. In an aspect, deactivating the linear regulator 268 can result in increased efficiency and decreased power consumption.

In another aspect, an internal signal EN1 350 can be generated to indicate a beginning and ending of the load transient period D1 368. The linear regulator 268 can alter EN1 350 (e.g., set to "1") to instruct first switch 220 and second switch 240 to complete a linear regulation loop to reduce the undershoot voltage and reduce the recovery time. In another aspect, linear regulator 268 can return EN1 350 to "0" such that the linear regulation loop is interrupted after D1 368 ends (e.g., linear regulator 268 is deactivated).

Figure 4:
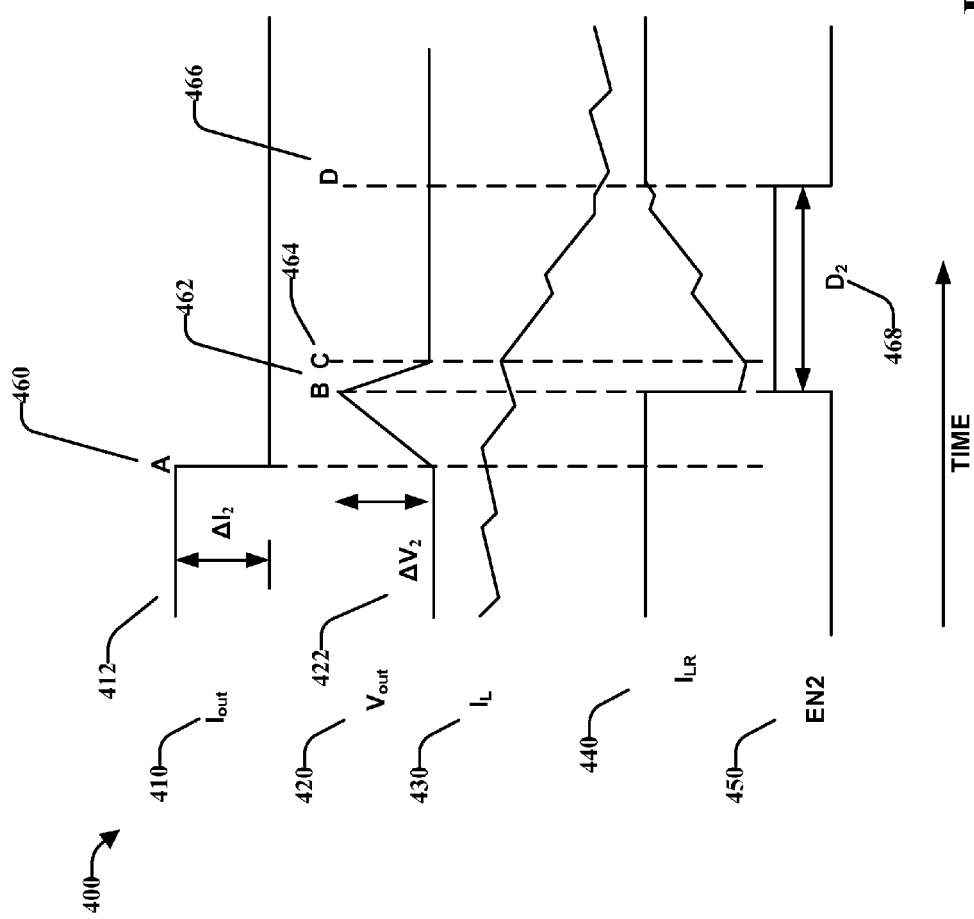
FIG. 4 is a timing diagram showing load transient responses in a load current step-down of a single-phase hybrid buck converter, according to an aspect or embodiment of the subject disclosure.

FIG. 4 is an example non-limiting timing diagram 400 of load transient responses of system 200 of FIG. 2. In an aspect, diagram 400 depicts timing of system 200 when the linear regulator 268 of FIG. 2 detects that the output 270 overshoots a predefined value.

Linear regulator 268 can determine whether or not the output 270 overshoots a predefined value. Diagram 400 depicts the output 270 as $V_{out}$ 420 and depicts the predefined value as $\Delta V_2$ 422 which steps up between a period from A 460 to B 462. In an aspect, the overshoot voltage can be caused by output current 272 of FIG. 2 step-down. For example, output current 272 can decrease as depicted by $I_{out}$ 410 step down by a value of $\Delta I_2$ 412.

At or about B 462, linear regulator 268 is activated to sink a current of $I_{LR}$ 340 to the loading to prevent the output 270 from further increasing. In an aspect, the linear regulator 268 can sink a predefined amount of current. Additionally, at or about B 462, a duty ratio, and hence current $I_L$ 430 generated by inductor 230, is decreased to provide less charge to the loading. In an aspect, the output 270 can be decreased to a value defining a steady-state value. In an aspect, the value defining the steady-state value can be determined based on reference 264.

In another aspect, as inductor 230 decreases current $I_L$ 430, the need for $I_{LR}$ 440 decreases as $I_L$ 430 and $I_{LR}$ 440 sum up to or approximately to the value of $I_{out}$ 410. For example, at or about C 464, $I_{LR}$ 440 begins do increase as $I_L$ 430 begins to decrease. After linear regulator 268 provides the initial value of $I_{LR}$ 340, the linear regulator 268 can decrease the value of $I_{LR}$ 440. In another aspect, the linear regulator 268 can determine whether or not the value of $I_{LR}$ 440 is decreased to a predefined value (e.g., inductor 230 decreases current to support the loading). When the linear regulator 268 determines the value of $I_{LR}$ 440 is decreased to the predefined value, the linear regulator 268 can deactivate at or about D 466. In an aspect, controller 260 can deactivate the linear regulator 268. In an aspect, deactivating the linear regulator 268 can result in increased efficiency and decreased power consumption.

In another aspect, an internal signal EN2 450 can be generated to indicate a beginning and ending of the load transient period D2 468. The controller 260 can set a value of EN2 450 at "1" to instruct first switch 220 and second switch 240 to complete a linear regulation loop to reduce the overshoot voltage and reduce the recovery time. In an aspect, the controller 260 can set EN2 450 to "0" such that the linear regulation loop is interrupted after the D2 468 ends (e.g., when linear regulator 268 is deactivated).

Figure 5:
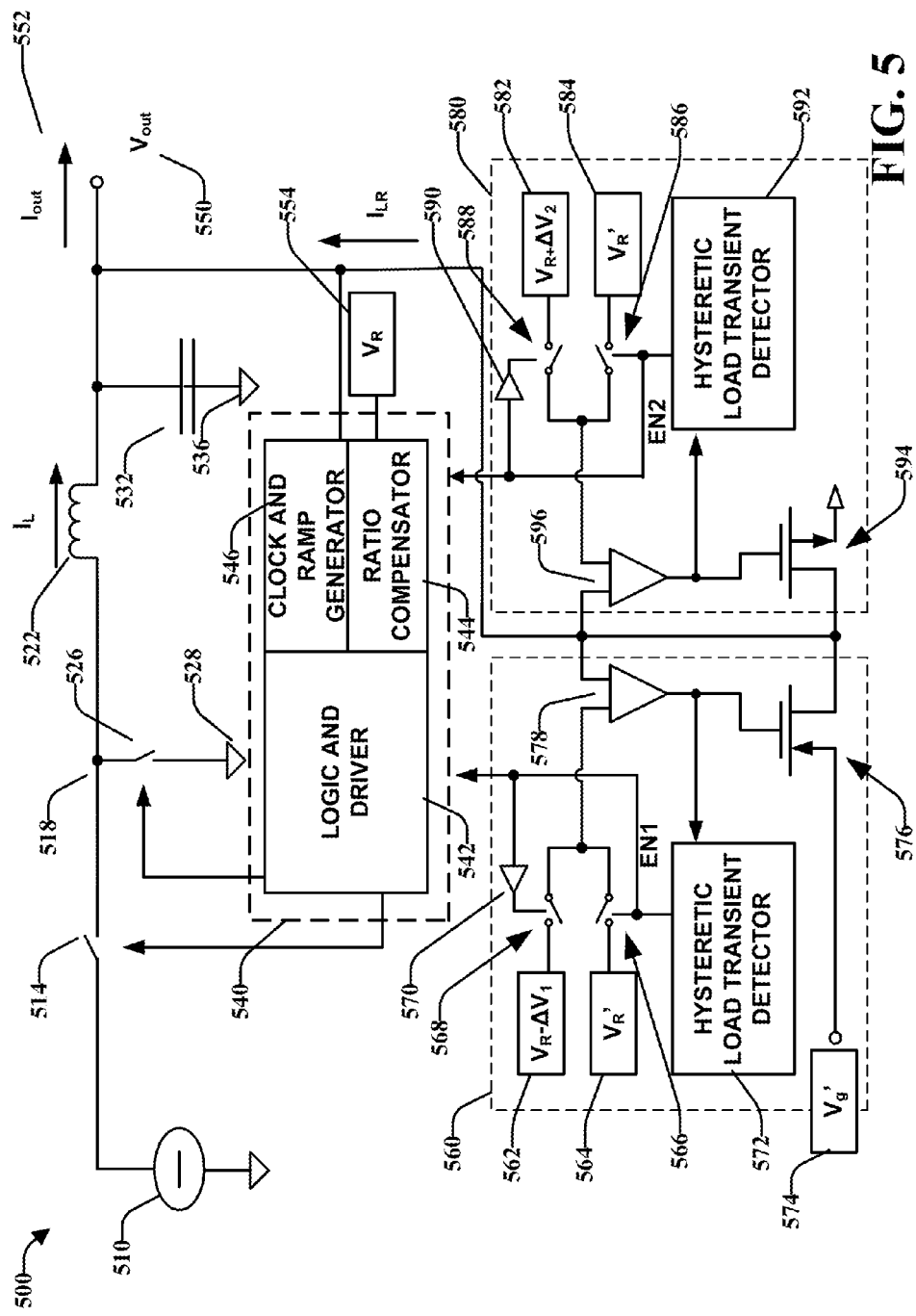
FIG. 5 is an example non-limiting schematic diagram of a system that facilitates automatic loop transitions including a linear regulator and controller, according to an aspect or embodiment of the subject disclosure.

FIG. 5 is an example non-limiting schematic diagram of a system 500 that facilitates automatic loop transitions including a linear regulator and controller. As described herein, the system 500 can be considered a single phase hybrid buck converter. It is noted that the system 500 can be various other types of semiconductor device. While the various components are illustrated as separate components, it is noted that the various components can be comprised in one or more other components. Further, it is noted that the system 500 can comprise additional components not shown for readability. Additionally, the various components may be contained on one integrated circuit, or on a number of individual circuits coupled together.

It is further noted system 500 can be within larger system such as smart phones, tablets, e-readers, digital video recorders, mobile media devices, personal computers, servers, memory sticks, digital video recorders (DVRs), solid state machines, consumer electronics and the like.

The system 500 includes power source 510 (e.g., $V_g$), a first switch 514 between power source 510 and vertex 518, an inductor 522, a second switch 526 between vertex 518 and a ground 528, an output capacitor 532, a ground 536, a controller 540 that can control states of switches (on/off), an output voltage 550, an output current 552, a first linear regulator 560, and a second linear regulator 580. The controller 540 can comprise a logic and driver component 542 that can turn on/off switches, a ratio compensator 544 that can stabilizes a switching converter and can be adjusted to have faster response during load transients, and a clock and ramp generator 546. It is noted that various components can comprise functionality similar to the components of FIG. 2. The first linear regulator 560 can detect a predefined output undershoot voltage and can source current to an output load. The second linear regulator 580 can detect a predefined output overshoot and can sink current from the output load.

The first linear regulator 560 can determine whether or not output 550 meets a predefined threshold defining an undershoot voltage. When the first linear regulator 560 determined the output 550 meets the predefined threshold defining the undershoot voltage, the first linear regulator 560 can provide a sourcing current ($I_{LR}$) to an output load. In an aspect, the provided source current can reduce a value of undershoot voltage during a load transient period.

The first linear regulator 560 can comprise a steady state reference voltage 562, a transient reference voltage 564, a switch 566, a switch 568, an amplifier 570, a hysteretic load transient detector 572 that indicates a beginning and ending of a load transient period, a power source 574 ($V_G'$) that can be the same or a disparate power source as power source 510, a cell 576, and an error amplifier 578. It is noted that steady state reference voltage 562, transient reference voltage 564, switch 566, switch 568, amplifier 570, hysteretic load transient detector 572, and/or power source 574 can represent a reference selection network that selects a lower reference voltage to detect a predefined output undershoot voltage and select a higher reference voltage to make the linear regulator source larger current to the output.

The second linear regulator 580 can determine whether or not output 550 meets a predefined threshold defining an overshoot voltage. When the second linear regulator 580 determined the output 550 meets the predefined threshold defining the overshoot voltage, the second linear regulator 580 can sink current ($I_{LR}$) from an output load. In an aspect, the sinking current can reduce overshoot voltage during a transient period.

The second linear regulator 580 can comprise a steady state reference voltage 582, a transient reference voltage 584, a switch 586, a switch 588, an amplifier 590, a hysteretic load transient detector 592 that indicates a beginning and ending of a load transient period, a cell 594, and an error amplifier 596. It is noted that steady state reference voltage 582, transient reference voltage 584, switch 586, switch 588, amplifier 590, hysteretic load transient detector 592, and/or power source 594 can represent a reference selection network that selects a higher reference voltage to detect a predefined output overshoot voltage and select a lower reference voltage to make the linear regulator sink larger current from the output.

In a steady state, the first linear regulator 560 selects steady state reference voltage 562 as a reference voltage by turning switch 568 to an on state (switch 566 off). When the first linear regulator 560 determines to enter a transient state, the first linear regulator selects transient reference voltage 564 as the reference voltage by turning switch 566 to an on state (switch 568 off). In an aspect, when the first linear regulator 560 uses steady state reference voltage 562, the error amplifier 578 acts as a comparator and the first linear regulator 560 is in a state defining an off state.

In an implementation, load variations or noise coupling can occur in system 500. The first linear regulator 560 can monitor the load variations or noise coupling to determine if the output 552 has an undershoot larger than a predetermined value ($\Delta V_1$). If the output 550 dips by the predetermined value, such as during a large and fast load current step-up, the hysteretic load transient detector 572 will force an output signal (EN1) to jump from "0" to "1" based on a sensed current value input to the hysteretic load transient detector 572. In another aspect, a reference voltage of first linear regulator 560 can be switched from steady state reference voltage 562 to transient reference voltage 566. In an aspect, the signal output by hysteretic load transient detector 572 can control on and off states of the switches (564 and 568).

In an aspect, the steady state reference voltage 562 can be equal to the difference of a reference voltage ($V_R$) 554 of the controller and the predetermined value $\Delta V_1$ or $V_R - \Delta V_1$. In another aspect, transient reference voltage 564 $V_R'$ can be larger than ($VR - \Delta V1$), equal to or about VR, or a predetermined value. In an implementation, a low-pass filter can be utilized to limit a ramp-up speed of the reference voltage of first linear regulator 560. Limiting the ramp-up speed can result in a smoother transition.

In implementations, when switch 566 is on and the transient reference voltage 564 is utilized, the first linear regulator 560 is activated in system 500 (e.g., the first linear regulator 560 loop is involved in system 500). In an aspect, the first linear regulator 560 can then regulate or source the output 550. The first linear regulator 560 can source the output until the output 550 returns to a steady state (e.g., within a predetermined value of reference voltage 554).

In implementations, the hysteretic load transient detector 572 can communicate a signal EN1 set at "1" to the controller 540. In an aspect, the ratio compensator 544 can increase a duty ratio, such that the current through inductor 522 (denoted $I_L$) is increased. In another aspect, the ratio compensator 544 can increase the duty ratio relatively quickly and hence the $I_L$ can be increased relatively quickly.

In an aspect, the ratio compensator 544 can be an adaptive duty ratio compensator as described below. It is noted that the ratio compensator 544 can utilize various methods of control such as type-I voltage-mode control, type-II voltage-mode control, type-III voltage-mode control, or current-mode control.

As the output 550 regulates back to a level defining a steady state (e.g., within a predetermined value of a reference voltage), the current $I_L$ of the inductor 522 approaches the output current ($I_{out}$) 552. The hysteretic load transient detector 572 can determine whether or not the output 550 is at a level defining a steady state. When the hysteretic load transient detector 572 determines the output is at a level defining a steady state, the hysteretic load transient detector 572 can change the output signal EN1 to "0". In an aspect, the hysteretic load transient detector 572 can then cause switch 568 to turn on and switch 566 to turn off. For example, the hysteretic load transient detector 572 can hand over the control loop from the first linear regulator 560 to a switching converter by selecting a normal duty ratio compensator.

In another implementation, the second linear regulator 580 can select steady state reference voltage 582 as a reference voltage by turning switch 588 to an on state (switch 586 off), while in state defining a steady state. In an aspect, when the second linear regulator 580 uses steady state reference voltage 582 the error amplifier 596 acts as a comparator and the second linear regulator 580 is in a state defining an off state, for example, circuitry of the second linear regulator 580 is interrupted.

In an implementation, the second linear regulator 580 can monitor the load variations or noise coupling, in system 500, to determine whether or not the output 552 surpasses an overshoot larger than a predetermined value ($\Delta V_2$). If the output 550 rises by the predetermined value $\Delta V_2$, such as during a large and fast load current step-down, the hysteretic load transient detector 592 will force an output signal (EN2) to jump from "0" to "1" based on a sensed current value input to the hysteretic load transient detector 592. In another aspect, a reference voltage of second linear regulator 580 can be switched from steady state reference voltage 582 to transient reference voltage 584. In an aspect, the signal output by hysteretic load transient detector 592 can control on and off states of the switches (586 and 588).

In an aspect, the steady state reference voltage 582 can equal the sum of a reference voltage ($V_R$) 554 of the controller and the predetermined value $\Delta V_2$ or $V_R + \Delta V_2$. In another aspect, transient reference voltage 584 $V_R'$ can be lower than ($V_R + \Delta V_2$), equal to or about VR, or a predetermined value. In an implementation, a low-pass filter can be utilized to limit a ramp-down speed of the reference voltage of second linear regulator 580. Limiting the ramp-down speed can result in a smoother transition.

In implementations, when switch 586 is on and the transient reference voltage 584 is utilized, the second linear regulator 580 is activated in system 500 (e.g., the second linear regulator 580 loop is involved in system 500). In an aspect, the second linear regulator 580 can then regulate or sink the output 550. The second linear regulator 580 can sink the output until the output 550 returns to a steady state (e.g., within a predetermined value of reference voltage 554).

In implementations, the hysteretic load transient detector 592 can communicate a signal EN2 set at "1" to the controller 540. In an aspect, the ratio compensator 544 can alter a duty ratio, such that the current through inductor 522 (denoted $I_L$) is decreased. In another aspect, the ratio compensator 544 can alter the duty ratio relatively quickly and hence $I_L$ can be decreased relatively quickly.

As the output 550 regulates back to a level defining a steady state (e.g., within a predetermined value of a reference voltage), the current $I_L$ of the inductor 522 approaches the output current ($I_{out}$) 552. The hysteretic load transient detector 592 can determine whether or not the output 550 is at a level defining a steady state. When the hysteretic load transient detector 592 determines the output is at a level defining a steady state, the hysteretic load transient detector 592 can change the output signal EN2 to "0". In an aspect, the hysteretic load transient detector 592 can then cause switch 588 to turn on and switch 586 to turn off. For example, the hysteretic load transient detector 592 can hand over the control loop from the second linear regulator 580 to a switching converter by selecting a normal duty ratio compensator.

Figure 6:
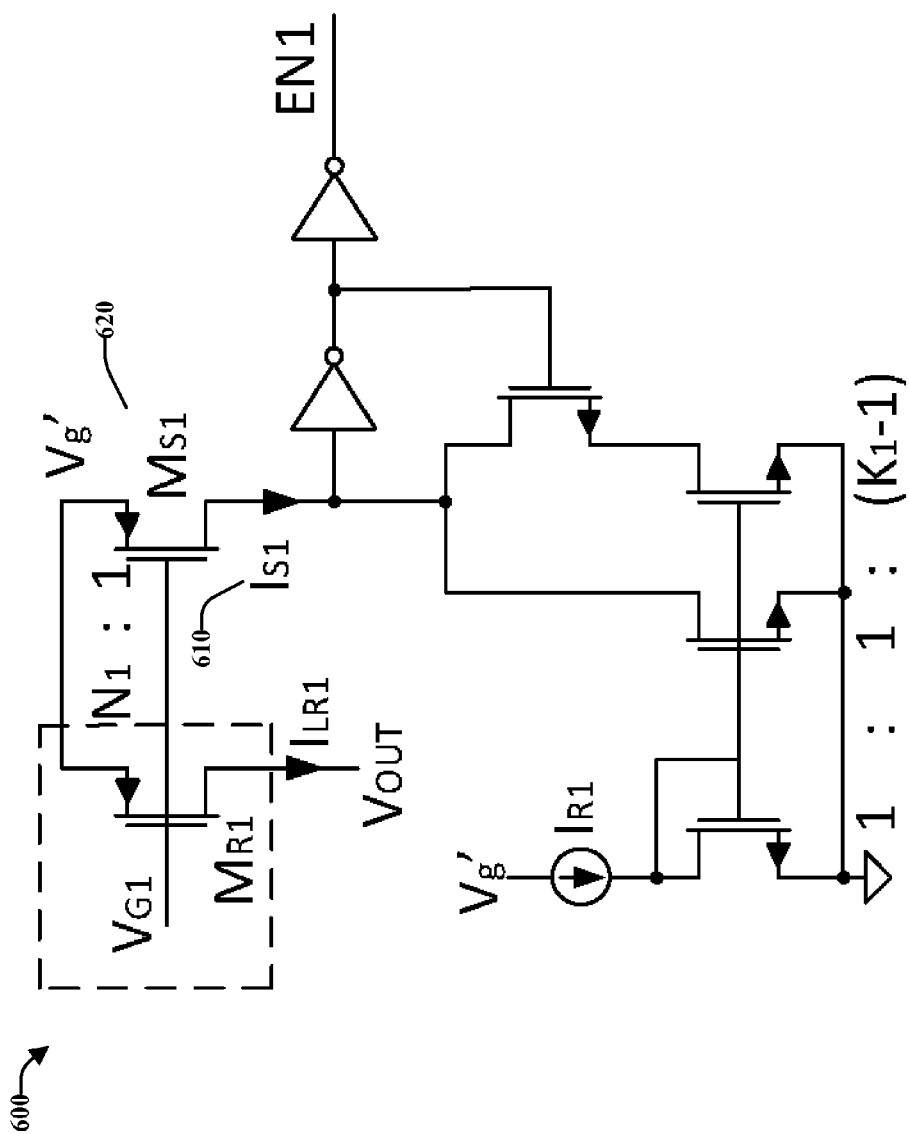
FIG. 6 is an example non-limiting schematic diagram of a hysteretic load transient detector, according to an aspect or embodiment of the subject disclosure.

FIG. 6 is an example non-limiting schematic of a system 600 that can function as a hysteretic load transient detector. In an aspect, the system 600 can be utilized by system 500, system 200, and/or system 100. System 600 can be a hysteretic load transient detector such as for a linear regulator (e.g., hysteretic load transient detector 572 of FIG. 5). In implementations, when large load transient occurs, the system 500 can indirectly detect an inductor current (e.g., $I_L$ of systems 200 and 500) by sensing a linear regulators' current (e.g., $I_{LR}$ of systems 200 and 500).

System 600 can sense a current $I_{S1}$ of cell 576. In an aspect, $I_{S1}$ can be a function of a current $I_{LR1}$ across a linear regulator. For example, $I_{S1}$ can be approximately equal to $I_{LR1}$ divided by $N_1$, where $N_1$ is a positive real number (e.g., 100, 1000, etc.).

Before large load transient happens, both $I_{LR1}$ and $I_{S1}$ are around 0, and EN1 is "0". When large load transient occurs, EN1 will jump from "0" to "1" once $I_{S1}$ rises to $K_1 \times I_{R1}$ where $K_1$ is a positive real number such as 10 or 20. When $V_{OUT}$ is being regulated back towards the steady state, $I_{S1}$ decreases as $I_L$ increases. When $I_{S1}$ drops to a small reference current of $I_{R1}$ meaning that $I_L$ almost reaches $I_{OUT}$, EN1 will be changed from "1" to "0". For $I_{S1}$ in-between $I_{R1}$ and $K_1 \times I_{R1}$, the EN1 signal maintains its value.

Figure 7:
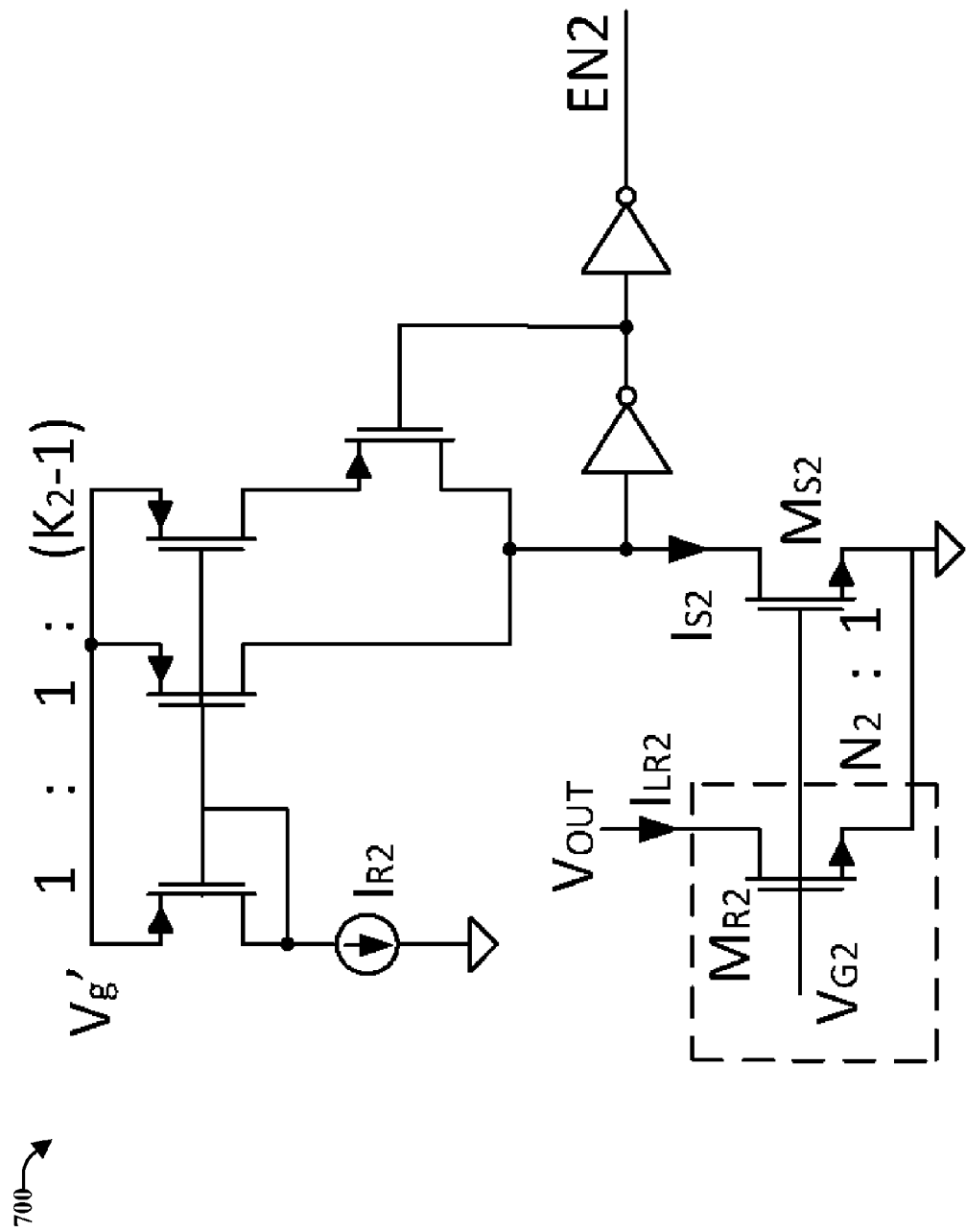
FIG. 7 is an example non-limiting schematic diagram of a hysteretic load transient detector, according to an aspect or embodiment of the subject disclosure.

FIG. 7 is an example non-limiting schematic of a system 700 that can function as a hysteretic load transient detector. In an aspect, the system 700 can be utilized by system 500, system 200, and/or system 100. In an aspect, system 700 can comprise a hysteretic load transient detector of a linear regulator that sinks a load. For example, system 700 can function as hysteretic load transient detector 592 of FIG. 5. In implementations, when large load transient occurs, the system 700 can indirectly detect an inductor current (e.g., $I_L$ of systems 200 and 500) by sensing a linear regulators' current (e.g., $I_{LR}$ of systems 200 and 500).

In an aspect, the system 700 can sense $I_{S2}$ of cell 594. In an aspect, $I_{S2}$ is proportional to an internal current of a linear regulator (e.g., $I_{LR2}$ of linear regulator 580) and is approximately equal to $I_{LR2}/N_2$ where $N_2$ is a positive real number such as 100 or 1000. Before large load transient happens, both $I_{LR2}$ and $I_{S2}$ are around 0, and EN2 is "0". When large load transient occurs, EN2 will jump from "0" to "1" once $I_{S2}$ rises to $K_2 \times I_{R2}$ where $K_2$ is a positive real number such as 10 or 20. When $V_{OUT}$ is being regulated back towards the steady state, $I_{S2}$ decreases as $I_L$ decreases. When $I_{S2}$ drops to a small reference current of $I_{R2}$ meaning that $I_L$ almost or does reaches $I_{out}$, EN2 will be changed from "1" to "0". For $I_{S2}$ between $I_{R2}$ and $K_2 \times I_{R2}$, the $EN_2$ signal maintains its value.

Figure 8:
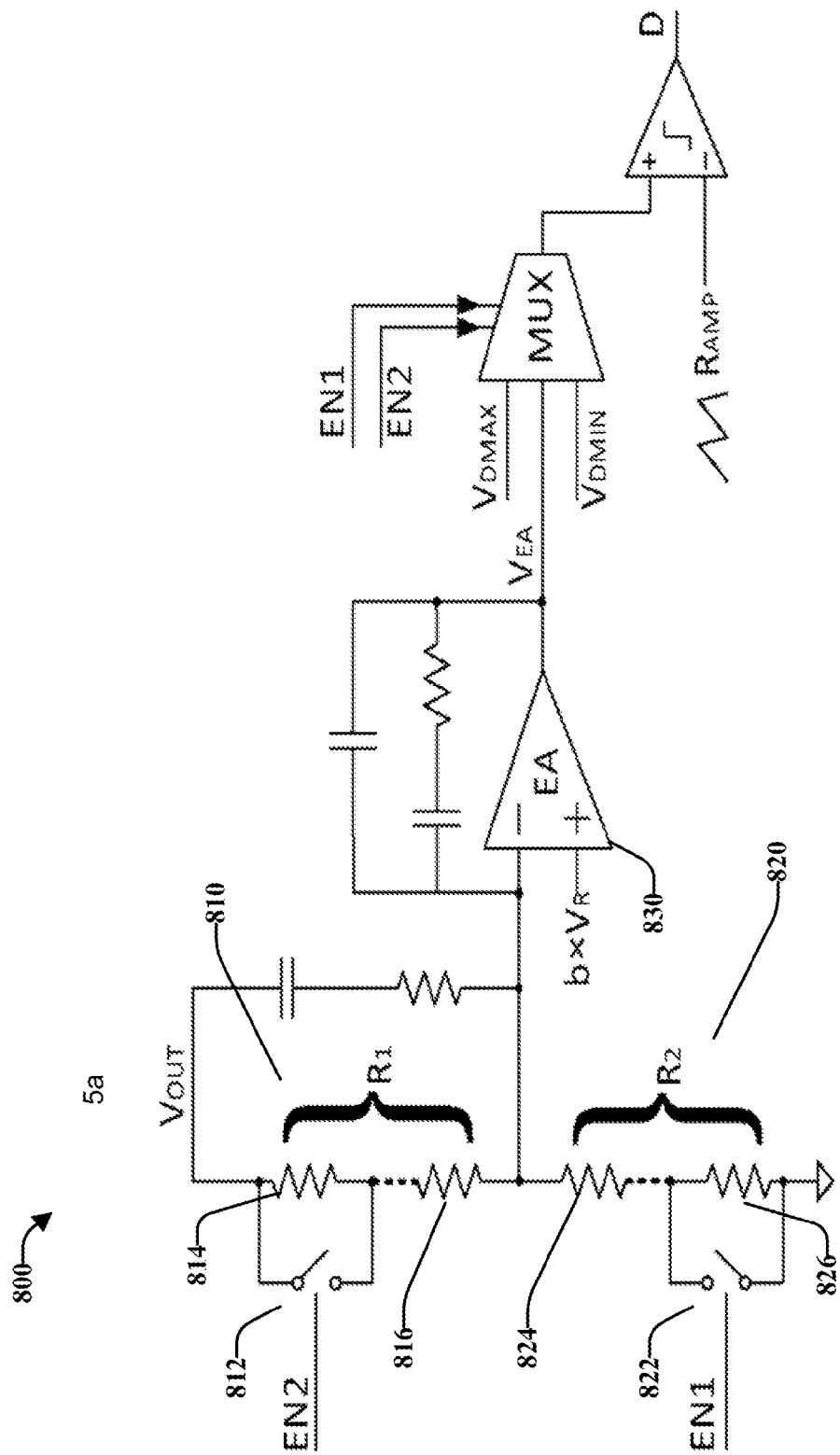
FIG. 8 is an example non-limiting schematic diagram of an adaptive duty ratio compensator that selects a maximum and minimum duty ratio, according to an aspect or embodiment of the subject disclosure.

FIG. 8 is an example non-limiting schematic of a system 800 that can function as an adaptive duty ratio compensator. In an aspect, the system 800 can be utilized by system 500, system 200, and/or system 100. The system 800 can comprise various components, such as resistors, capacitors, error amplifiers, multiplexers, amplifiers, and the like. For example, system 800 can comprise a resistor ($R_1$) 810, a switch 812, a resistor 814, a resistor 816, a resistor ($R_2$) 820, a switch 822, a resistor 824, and a resistor 826. In an aspect, the system 800 can determine a steady-state resistive division ratio, denoted as "b", herein. In an implementation, system 800 can calculate b as $b=R_2/(R_1+R_2)$.

Referring to system 500, when in a steady state both the EN1 and EN2 are "0". Thus both switch 812 and switch 822 are open and the full part of $R_1$ 810 and $R_2$ 820 are used such that the normal duty ratio is generated to regulate $V_{OUT}$. During large load current step-up when EN1 is forced to "1" by the hysteretic load transient detector 572 of linear regulator 560, a portion of $R_2$ 820 is shorted to give a smaller $R_2$ hence a smaller portion of $V_{OUT}$ is fed to a negative input-terminal of the error amplifier 830. As result, the differential input to the error amplifier 830 increases and the voltage at $V_{EA}$ increases to give a faster increase of the duty ratio.

In another implementation, during large load current step-down when EN2 is forced to "1" by the hysteretic load transient detector 592 of linear regulator 580, a portion of $R_1$ 810 is shorted to give a smaller $R_1$ 810 hence a larger portion of $V_{OUT}$ is fed to a negative input-terminal of error amplifier 830. As result, a differential input to the error amplifier 830 decreases and a voltage at $V_{EA}$ decreases to give a faster decrease of the duty ratio.

In various implementations, system 800 utilizes EN1 and EN2 signals to select a maximum and a minimum duty ratio during the load transient period of D1 and D2 as described in FIGS. 3 and 4, respectively. In another aspect, the inductor current IL during the transient periods can be increased or decreased more quickly, with the price of higher design complexity. Instead of shorting a portion of $R_1$ or $R_2$, it is apparent that the reference voltage $b \times V_R$, i.e., the positive input-terminal of an error amplifier can be adjusted to achieve the similar effect of duty ratio changes.

Figure 9:
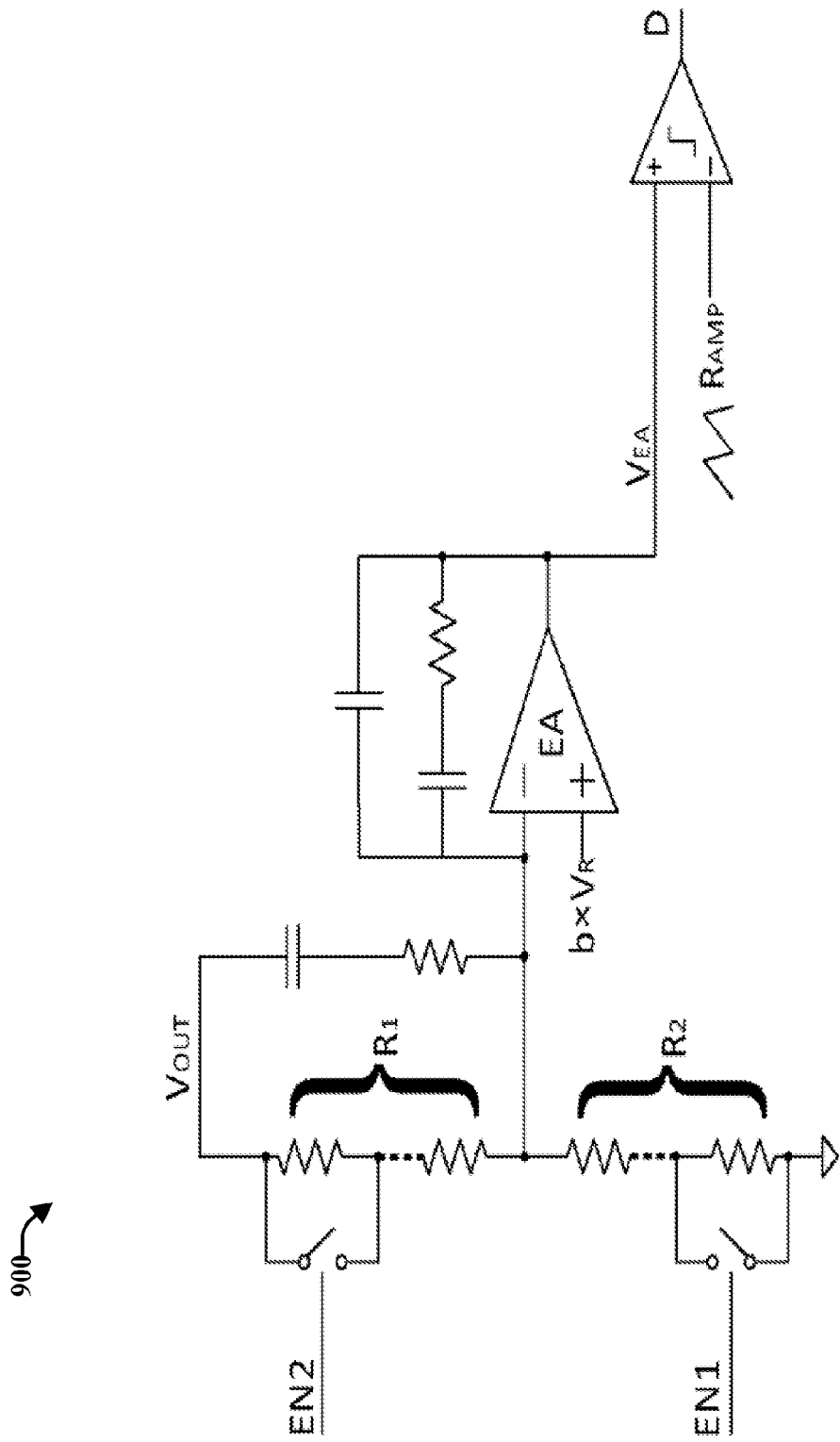
FIG. 9 is an example non-limiting schematic diagram of an adaptive duty ratio compensator, according to an aspect or embodiment of the subject disclosure.

FIG. 9 is an example non-limiting schematic of a system 900 that can function as an adaptive duty ratio compensator. In an aspect, the system 900 can be utilized by system 500, system 200, and/or system 100. In an aspect, system 900 functions similarly to system 800. However, system 900 does not utilize EN1 and EN2 signals to select a maximum and a minimum duty ratio during the load transient period of D1 and D2.

Figure 10:
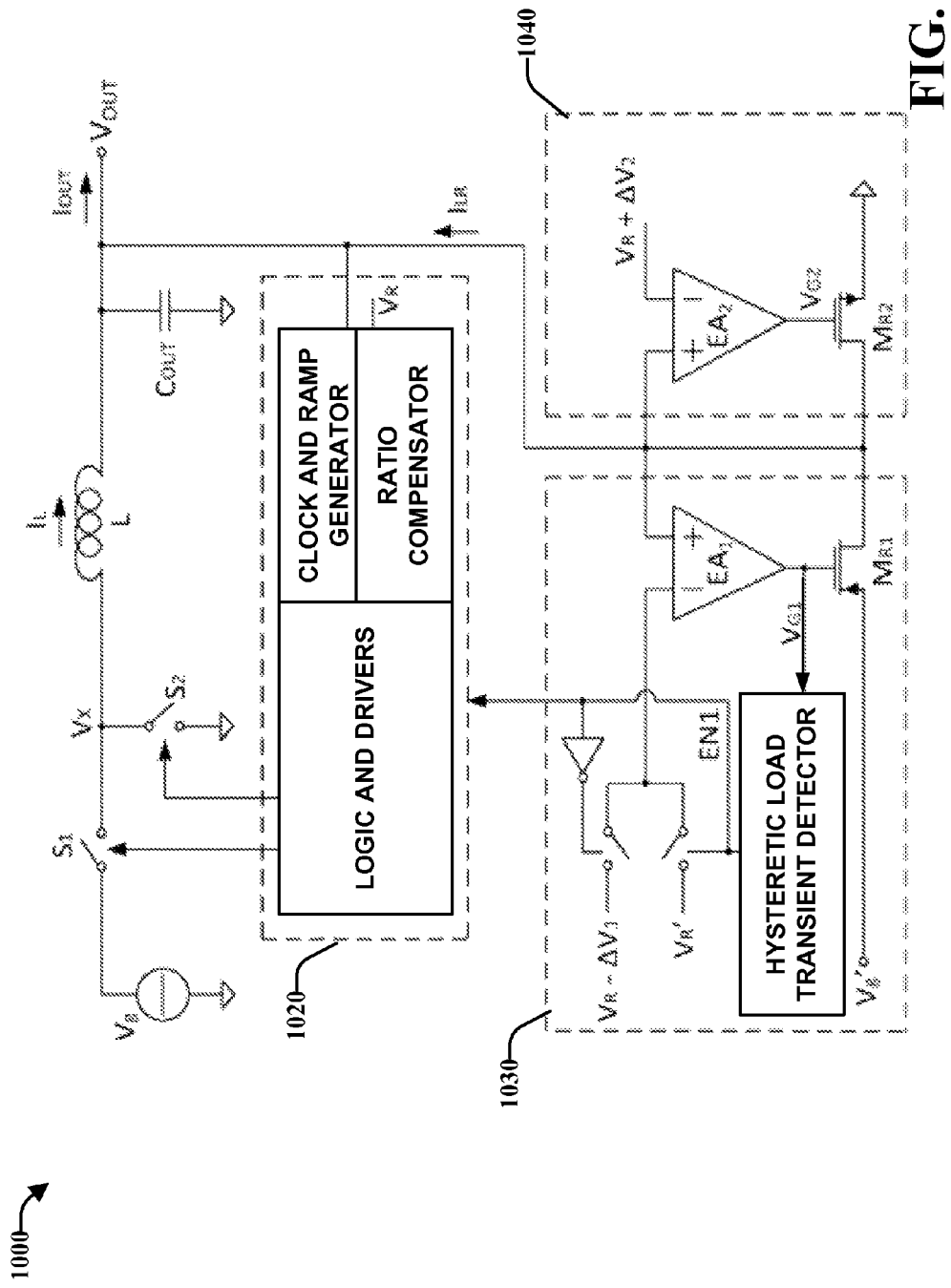
FIG. 10 is an example non-limiting schematic diagram of a system that facilitates automatic loop transitions including a single phase hybrid buck converter, linear regulators, and a controller used to achieve undershoot fast-recovery and overshoot prevention-only, according to an aspect or embodiment of the subject disclosure.

FIG. 10 is an example non-limiting schematic of a system 1000 that comprises linear regulators and a controller with undershoot fast-recovery and overshoot protection-only applied to a single phase hybrid buck converter. In an aspect, system 1000 can comprise a controller 1020, a linear regulator 1030, a linear regulator 1040, and various other components. It is noted that aspects of system 1000 can perform similar and/or identical to aspects of systems 100, 200, and 500 as described above. For example, the linear regulator 1030 can function similarly and/or identically to the first linear regulator 260 of FIG. 2.

In an implementation, the linear regulator 1040 can utilize a single reference voltage (depicted as the sum of $V_R+\Delta V_2$). Accordingly, the linear regulator 1040 need not have a reference selection network, hysteretic load transient detector, and/or various other components. In an aspect, the linear regulator 1040 can determine whether or not an output is overshooting larger than a predefined value (e.g., $\Delta V_2$). If the linear regulator 1040 determines that the output is overshooting larger than $\Delta V_2$, then the linear regulator 1040 can sink current from an output load to an output capacitor.

In another aspect, since the linear regulator 1040 does not contain a reference selection network, the linear regulator 1040 does not need to send a signal indicating a start and end of a transient period to the controller 1020. Hence, the controller 1020 can be configured to receive only signal(s) indicating a start and end of a transient period, such as from the linear regulator 1030.

Figure 11:
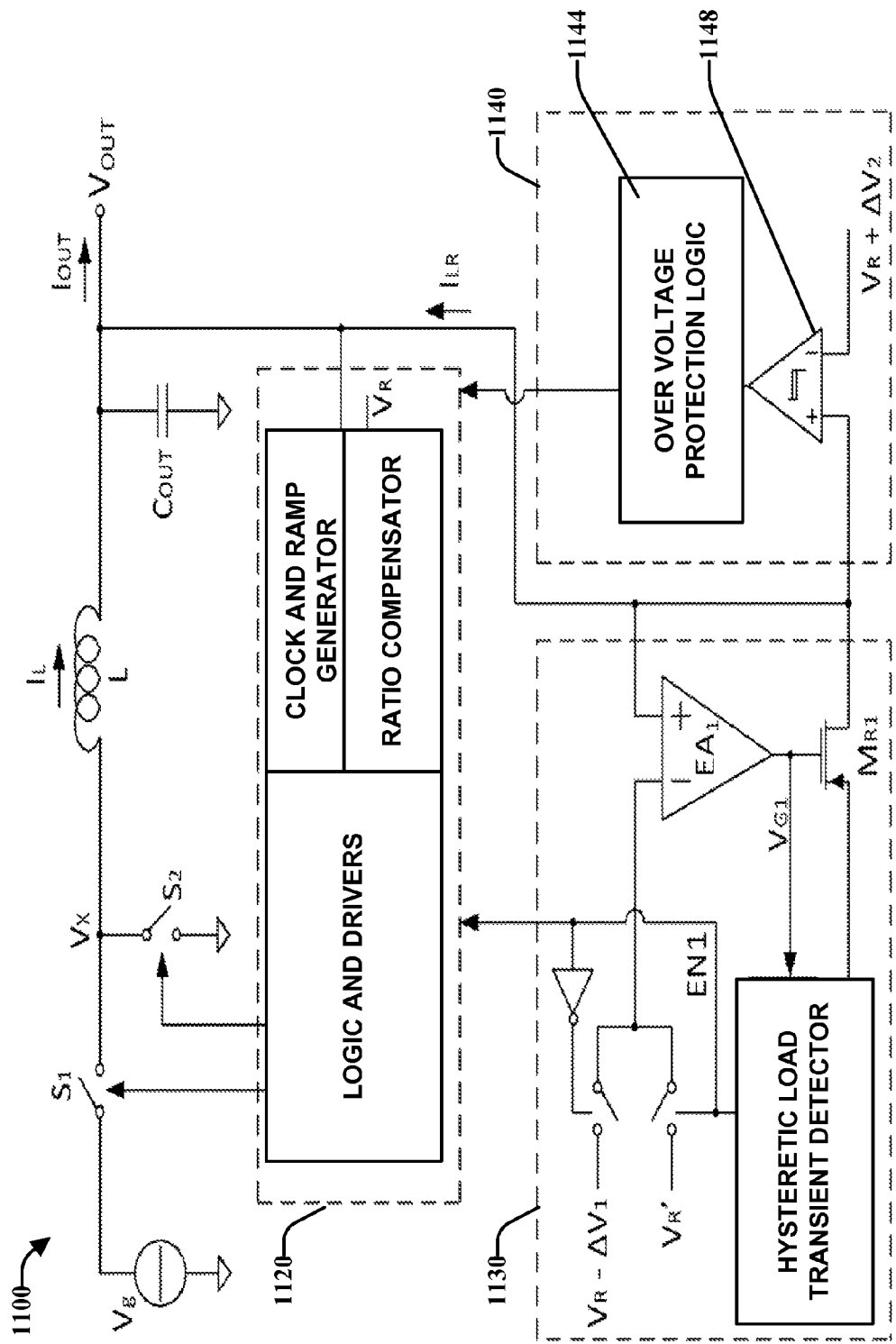
FIG. 11 is an example non-limiting schematic diagram of a system that facilitates automatic loop transitions including a single phase hybrid buck converter and linear regulator used to achieve undershootfast-recovery and an over voltage protection logic, according to an aspect or embodiment of the subject disclosure.

FIG. 11 is an example non-limiting schematic of a system 1100 that comprises a linear regulator and a controller with undershoot fast-recovery and an over voltage protection logic applied to a single phase hybrid buck converter. In an aspect, system 1100 can comprise a controller 1120, a linear regulator 1130, an over voltage protection component 1140, and various other components. It is noted that aspects of system 1100 can perform similar and/or identical to aspects of systems 100, 200, 500, and 1000 as described above. For example, the linear regulator 1130 can function similarly and/or identically to the first linear regulator 260 of FIG. 2.

In an aspect, the over voltage protection component 1140 can be configured to detect a predefined output overshoot voltage using a comparator 1148 and an over voltage protection logic component 1144 to provide a control signal to the controller to make one or more inductors accumulate less charge to the output load. It is noted that the over voltage protection component 1140 can comprise a hysteretic comparator whose output is used to control a switching converter to accumulate less charge to an output.

Figure 12:
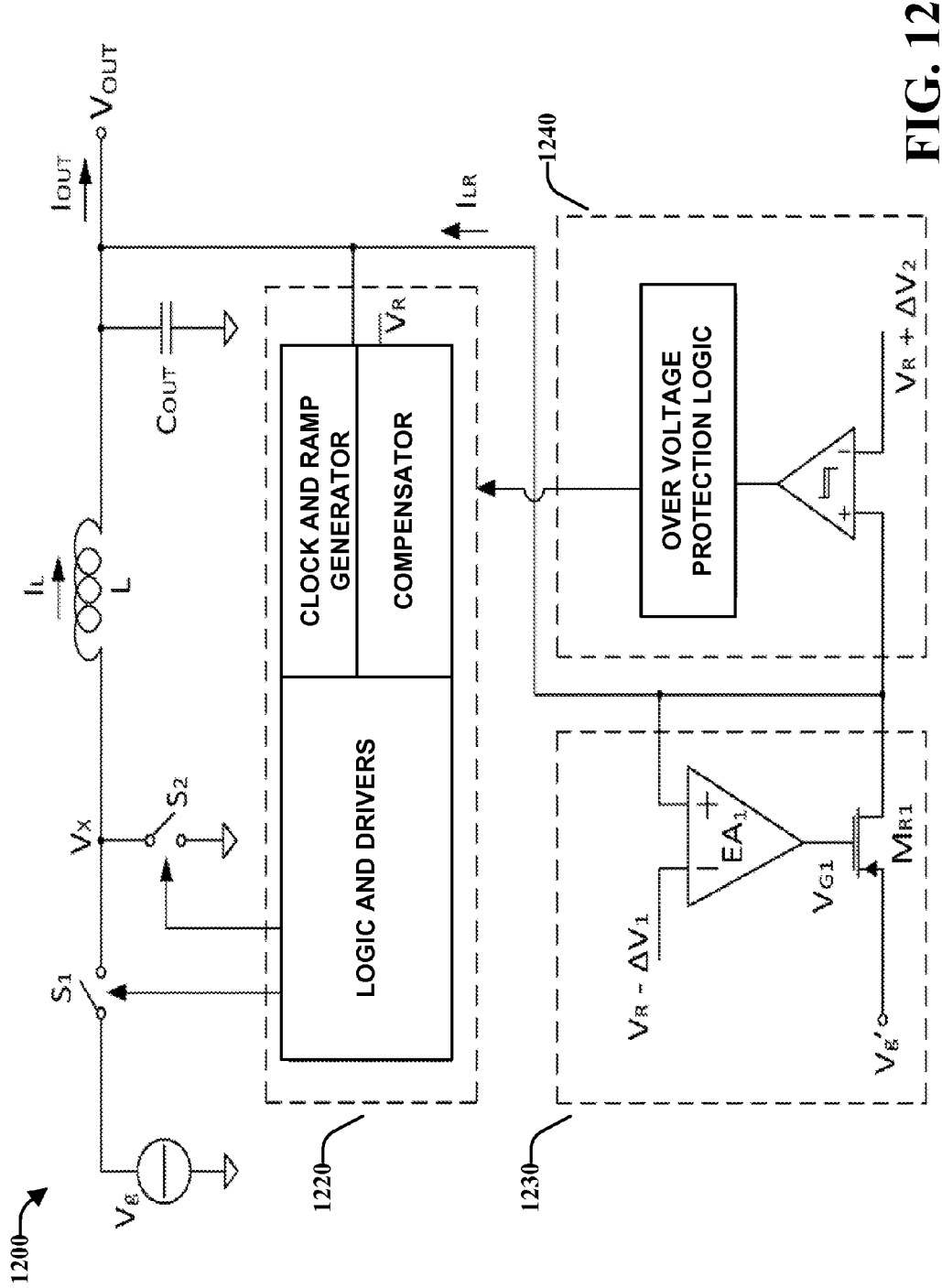
FIG. 12 is an example non-limiting schematic diagram of a system that facilitates automatic loop transitions including a single phase hybrid buck converter and a linear regulator used to achieve undershoot prevention-only and an over voltage protection logic, according to an aspect or embodiment of the subject disclosure.

FIG. 12 is an example non-limiting schematic of a system 1200 that comprises a linear regulator and a controller with undershoot prevention-only and an over voltage protection logic applied to a single phase hybrid buck converter. In an aspect, system 1200 can comprise a controller 1220, a linear regulator 1230, an over voltage protection component 1240, and various other components. It is noted that aspects of system 1200 can perform similar and/or identical to aspects of systems 100, 200, 500, 1000, and 1100 as described above. For example, the over voltage protection component 1240 can function similarly and/or identically to the over voltage protection component 1140 of FIG. 11.

In an implementation, the linear regulator 1230 can be configured to prevent an output from undershooting larger than a predetermined value ($\Delta V_1$). The linear regulator 1230 can determine whether or not an output voltage is undershooting larger than $\Delta V_1$. In an aspect, the linear regulator 1230 can utilize a single reference voltage (depicted as the sum of $V_R - \Delta V_1$). Accordingly, the linear regulator 1230 need not have a reference selection network, hysteretic load transient detector, and/or various other components. In an aspect, if the linear regulator 1230 determines that the output is undershooting larger than $\Delta V_1$, then the linear regulator 1230 can source current to the output.

Figure 13:
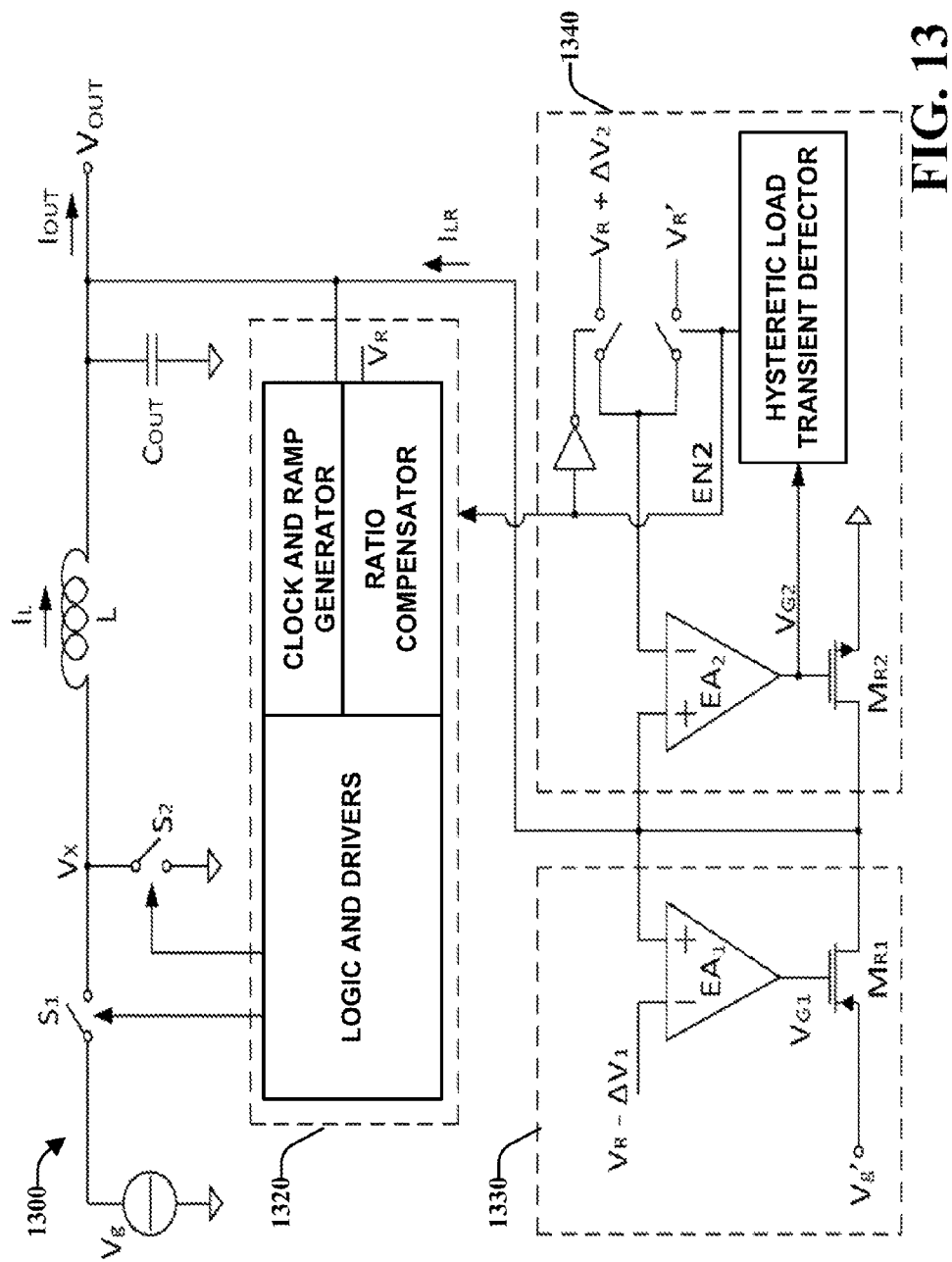
FIG. 13 is an example non-limiting schematic diagram of a system that facilitates automatic loop transitions including a single phase hybrid buck converter, linear regulators, and a controller used to achieve undershoot prevention-only and overshoot fast-recovery, according to an aspect or embodiment of the subject disclosure.

FIG. 13 is an example non-limiting schematic of a system 1300 that comprises linear regulators and a controller with undershoot prevention-only and overshoot fast-recovery applied to a single phase hybrid buck converter. In an aspect, system 1300 can comprise a controller 1320, a linear regulator 1330, a linear regulator 1340, and various other components. It is noted that aspects of system 1300 can perform similar and/or identical to aspects of systems 100, 200, 500, 1000, 1100, and 1200 as described above. For example, the linear regulator 1330 can function similarly and/or identically to the linear regulator 1230 of FIG. 12, and the linear regulator 1340 can function similarly and/or identically to the second linear regulator 580 of FIG. 5.

In an implementation, the controller 1320 can be configured to receive a signal from the linear regulator 1340 without receiving a signal from the linear regulator 1330. Accordingly, a ratio compensator can be simplified to receive only one control signal form the linear regulator 1340.

Figure 14:
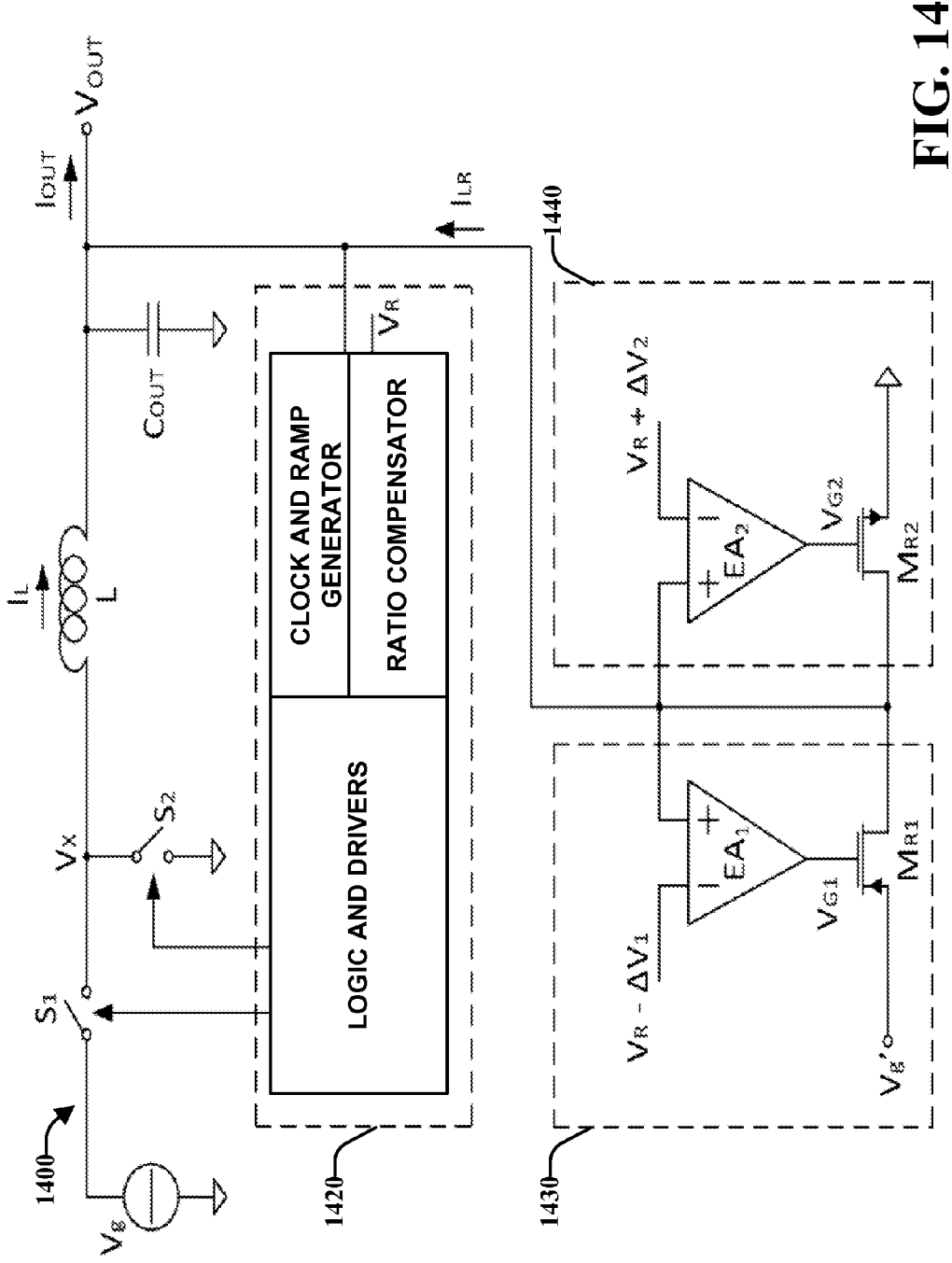
FIG. 14 is an example non-limiting schematic diagram of a system that facilitates automatic loop transitions including a single phase hybrid buck converter and linear regulators and controller used to achieve undershoot prevention —only and overshoot prevention —only, according to an aspect or embodiment of the subject disclosure.

FIG. 14 is an example non-limiting schematic of a system 1400 that comprises linear regulators and a controller with undershoot prevention-only and overshoot prevention-only applied to a single phase hybrid buck converter. In an aspect, system 1400 can comprise a controller 1420, a linear regulator 1430, a linear regulator 1440, and various other components. It is noted that aspects of system 1400 can perform similar and/or identical to aspects of systems 100, 200, 500, 1000, 1100, 1200, and 1300 as described above. For example, the linear regulator 1330 can function similarly and/or identically to the linear regulator 1230 of FIG. 12, and the linear regulator 1440 can function similarly and/or identically to the linear regulator 1040 of FIG. 10.

In an aspect, the controller 1420 can be configured such that the linear regulators do not send a control signal. In an aspect, a ratio compensator of the controller 1420 can be simplified such that adjustment of a resistive division ratio or a reference voltage is based on a reference voltage and not a control signal from linear regulators.

Figure 15:
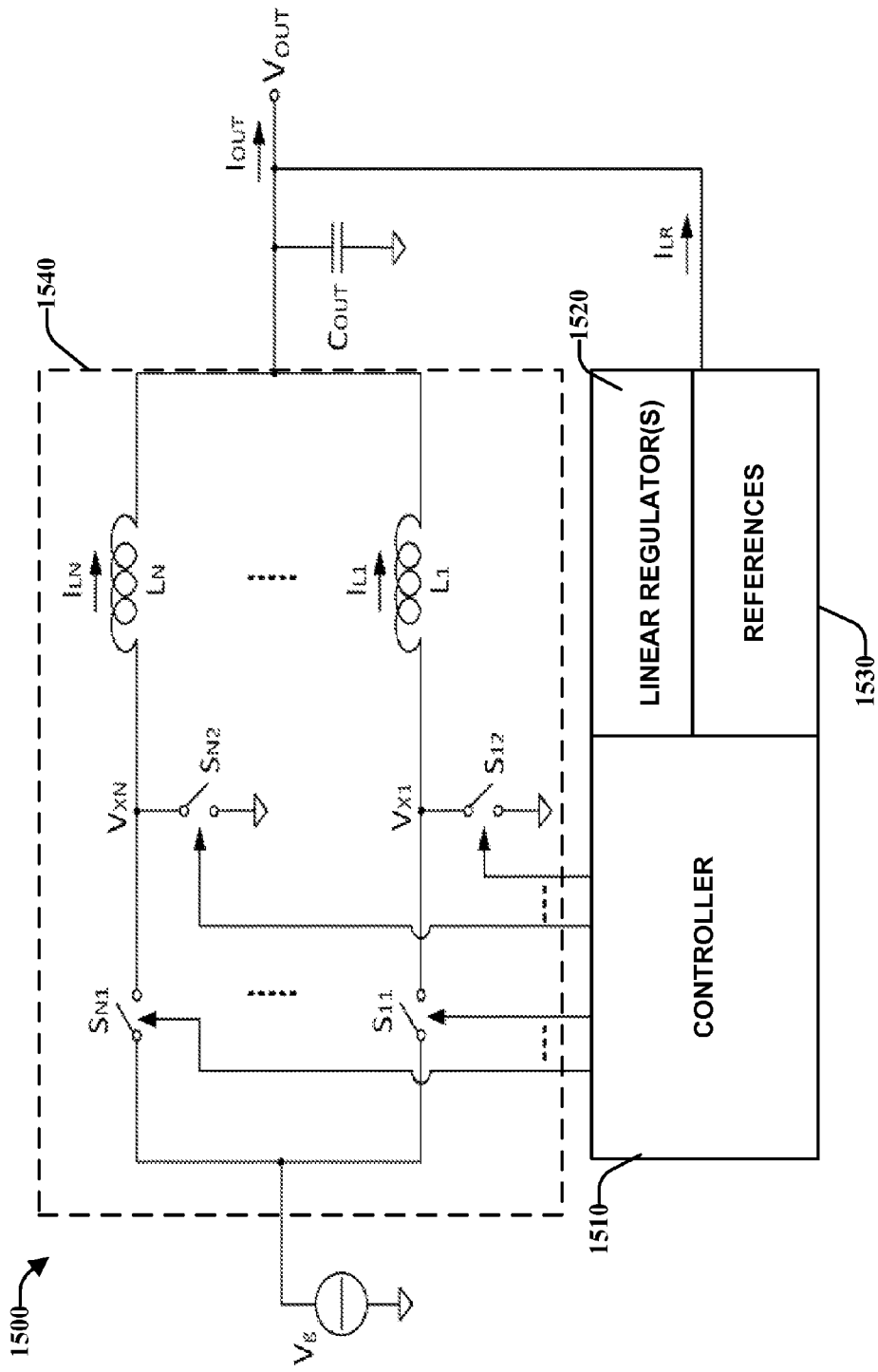
FIG. 15 is an example non-limiting schematic diagram of a system that facilitates automatic loop transitions including a multi-phase hybrid buck converter, according to an aspect or embodiment of the subject disclosure.

FIG. 15 is an example non-limiting schematic of a system 1500 that comprises linear regulators applied to a multi-phase hybrid buck converter. In an aspect, system 1500 can comprise a controller 1510, linear regulator(s) 1520, voltage references 1530, a multi-phase buck converter 1540, and various other components. It is noted that aspects of system 1500 can perform similar and/or identical to aspects of systems 100, 200, 500, 1000, 1100, 1200, 1300, and 1400 as described above. For example, linear regulators 1520 can comprise linear regulator 268 of system 200, first linear regulator 560 and second linear regulator 580 of system 500, and/or various linear regulators and voltage protection components. It is noted that system 1500 can comprise undershoot prevention-only and/or overshoot prevention-only as described herein.

In an aspect, multi-phase pure buck converter 1540 can apply various aspects disclosed herein to control transient responses arriving at multi-phase hybrid buck converter 1540. In an aspect, the controller 1510 can be configured with additional drivers and clock signals to accommodate for the operation of different phases. In another aspect, the references 1530 can comprises various references described herein. It is noted that the controller 1510 and references 1530 can be configured based on the linear regulator(s) 1520 selected for utilization and/or the number of phases of the multi-phase buck converter 1540.

In implementations, multiphase buck converter 1540 can comprise basic buck converters placed in parallel between an input and a load. In an aspect, the controller can turn on/off each n phases at intervals over a switching period. In an aspect, the multiphase buck converter 1540 can comprise one or more switches. In an example, the one or more switches can be configured in parallel with one or more inductors, diodes, resistors and the like. It is noted that the configuration of switches and/or various components can depend on a desired number of n phases.

Figure 16:
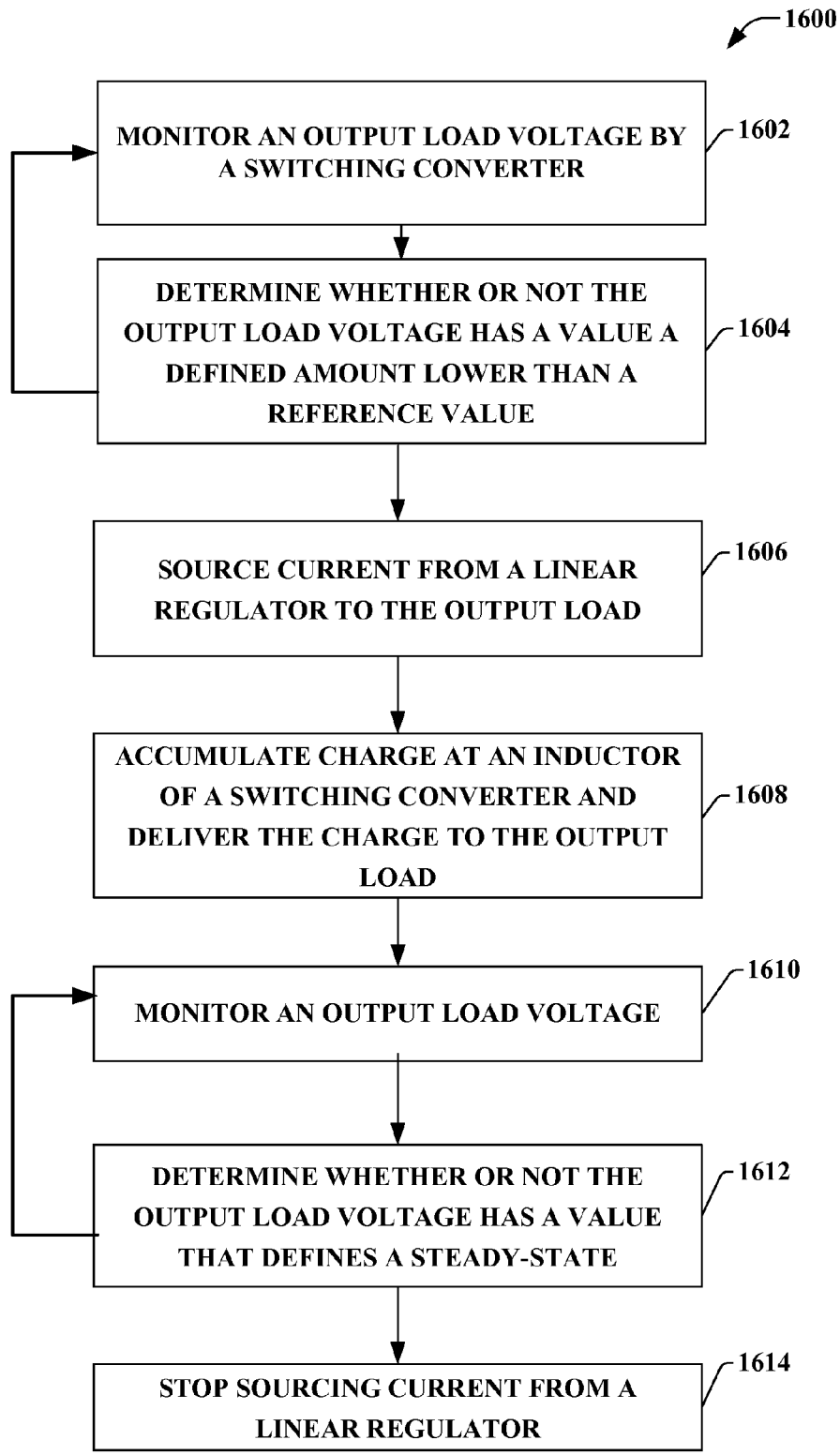
FIG. 16 is an example non-limiting process flow diagram of a method that facilitates automatic loop transitions and voltage management of a semiconductor device, according to an aspect or embodiment of the subject disclosure.
Figure 17:
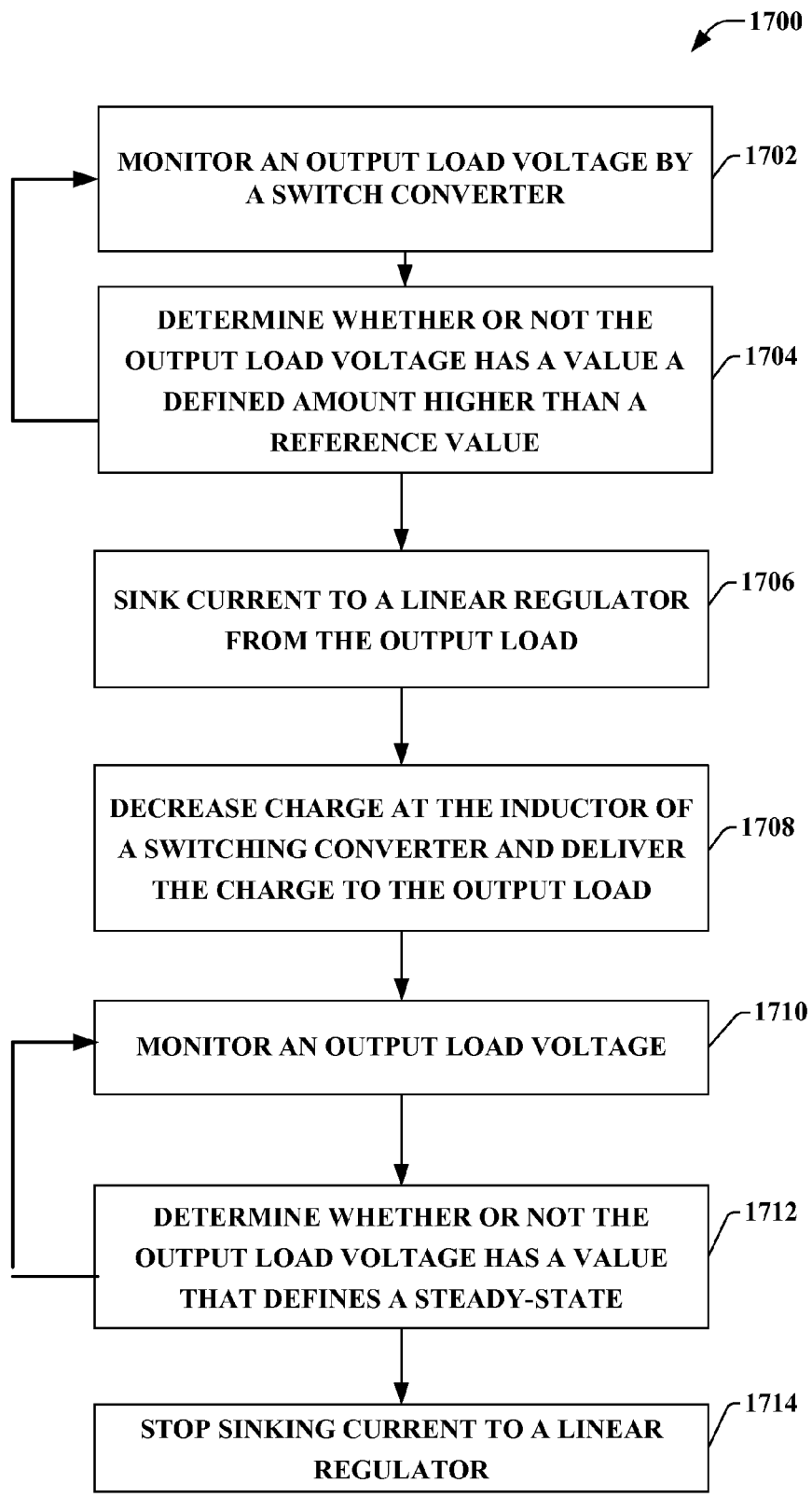
FIG. 17 is an example non-limiting process flow diagram of a method that facilitates automatic loop transitions and voltage management of a semiconductor device, according to an aspect or embodiment of the subject disclosure.
Figure 18:
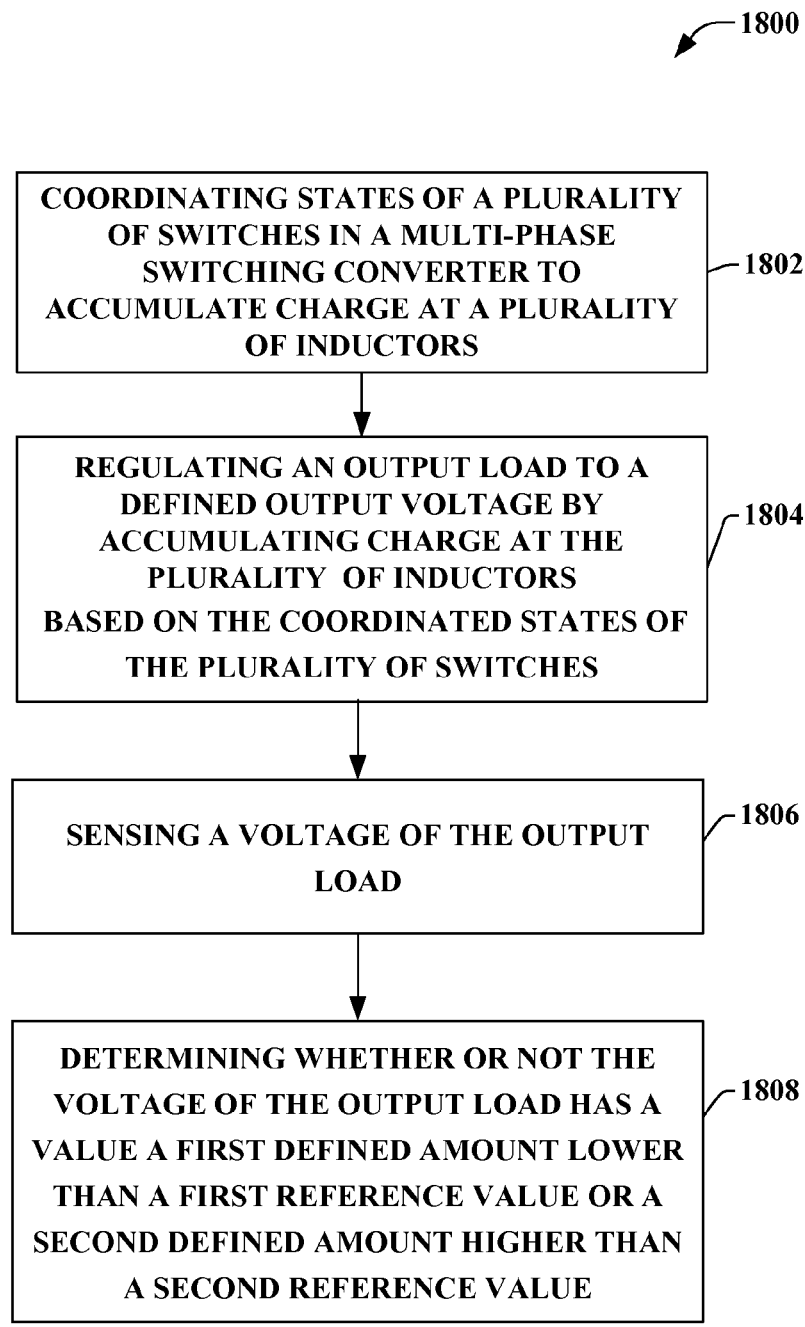
FIG. 18 is an example non-limiting process flow diagram of a method that facilitates automatic loop transitions and voltage management of a semiconductor device, according to an aspect or embodiment of the subject disclosure.

FIGS. 16-18 illustrate methods 1600, 1700, and 1800 that facilitate voltage regulating in a semiconductor device. For simplicity of explanation, the methods (or procedures) are depicted and described as a series of acts. It is noted that the various embodiments are not limited by the acts illustrated and/or by the order of acts. For example, acts can occur in various orders and/or concurrently, and with other acts not presented or described herein.

FIG. 16 illustrated is an example non-limiting process flow diagram of a method 1600 that facilitates voltage regulation and current sourcing. The voltage regulation can be performed by various implementations described herein.

At 1602, a system can monitor an output load voltage by a switching converter. For example, a linear regulator and/or the like can monitor a voltage of an output.

At 1604, a system can determine whether or not the output load voltage has a value a defined amount lower than a reference value. In an aspect, a reference value can be a predetermined value and a system, such as a linear regulator, can compare the output to the predetermined value.

At 1606, a system can source current from a linear regulator to the output load. In implementations, a linear regulator can provide current to an output and/or output capacitor. In an aspect, the provided current can increase an output.

At 1608, a system can accumulate charge at an inductor of a switching converter and deliver the charge to the output load. In implementations, a switching converter can charge an inductor and a controller can manage the switching converter to charge the inductor based on a signal from a linear regulator.

At 1610, a system can monitor an output load voltage. For example, a linear regulator and/or the like can monitor a voltage of an output.

At 1612, a system can determine whether or not the output load voltage has a value that defines a steady-state. For example, a linear regulator can determine whether or not the output load has a value meeting a predefined steady-state threshold.

At 1614, a system can stop sourcing current from a linear regulator. For example, a linear regulator can be deactivated such that current is not communicated from a linear regulator to an output load.

FIG. 17 illustrates an example non-limiting process flow diagram of a method 1700 that facilitates voltage regulation and current sinking. The voltage regulation can be performed by various implementations described herein.

At 1702, a system can monitor a voltage of an output load output by a switching converter. For example, a linear regulator, over voltage protection component, and/or the like can monitor a voltage of an output.

At 1704, a system can determine whether or not the voltage of the output load has a value a defined amount higher than a reference value. In an aspect, a reference value can be a predetermined value and a system, such as a linear regulator, can compare the output to the predetermined value.

At 1706, a system can sink current to a linear regulator from the output load (output capacitor and output). In implementations, a linear regulator can sink current from an output and/or output capacitor. In an aspect, the provided current can decrease an output.

At 1708, a system can decrease a charge at an inductor of a switching converter and deliver the charge to the output load. In implementations, a switching converter can reduce charge supplied to an inductor and a controller can manage the switching converter to reduce the charge of the inductor based on a signal from a linear regulator and the like.

At 1710, a system can monitor an output load voltage. For example, a linear regulator, over voltage protection component, and/or the like can monitor a voltage of an output.

At 1712, a system can determine whether or not the output load voltage has a value that defines a steady-state. For example, a linear regulator can determine whether or not the output load has a value meeting a predefined steady-state threshold.

At 1714, a system can stop sinking current to a linear regulator.

FIG. 18 illustrated is an example non-limiting process flow diagram of a method 1800 that facilitates voltage regulation in a system. The voltage regulation can be performed by various implementations described herein.

At 1802, a system can coordinate states of a plurality of switches in a multi-phase switching converter to accumulate charge at a plurality of inductor. For example, a controller can instruct switches in a switching converter to alter states (e.g., on/off).

At 1804, a system can regulate an output load to a defined output voltage by accumulating charge at the plurality of inductors based on the coordinated states of the plurality of switches. In an aspect, a controller can alter states of a plurality of switches to complete circuit paths that include an inductor.

At 1806, a system can sense a voltage of the output load. For example, a linear regulator, over voltage protection component, switching converters, and the like can sense the voltage of the output load.

At 1808, a system can determine whether or not the voltage of the output load has a value a first defined amount lower than a first reference value or a second defined amount higher than a second reference value. For example, the first defined amount lower than the first reference determining can define an output undershoot voltage threshold. As another example, the second defined amount higher than second reference value can define an output overshoot voltage threshold. In implementations, linear regulators, over voltage protection component, and the like can determine whether or not the voltage of the output load is at a level defining determining whether or not the voltage of the output load is at a level defining at least one of an output undershoot voltage threshold or an output overshoot voltage threshold. In an aspect, the output undershoot voltage threshold can be a defined voltage lower than a voltage reference. In another aspect, the output overshoot voltage threshold can be a defined voltage higher than a voltage reference.

The above description of illustrated aspects and embodiments, including what is described in the Abstract, is not intended to be exhaustive or to limit the disclosed aspects and embodiments to the precise forms disclosed. While specific aspects and embodiments and examples are described herein for illustrative purposes, various modifications are possible that are considered within the scope of such aspects and embodiments and examples, as those skilled in the relevant art can recognize.

As used herein, the word "example" is used herein to mean serving as an example, instance, or illustration. For the avoidance of doubt, the subject matter described herein is not limited by such examples. In addition, any aspect or design described herein as an "example" is not necessarily to be construed as preferred or advantageous over other aspects or designs, nor is it meant to preclude equivalent structures.

It is noted that designs described herein can be applied to other hybrid buck converters. For clarity, the examples are based on single phase hybrid buck converter and multi-phase buck converters. It is noted that variations to modify the design to make other combinations and forms of designs. For example, various linear regulators, controllers, hysteretic load transient detectors, switches, converters, circuitry, and other components can be utilized in various implementations.

The terms "first," "second," "third," "fourth," and the like in the description and the claims, if any, may be used for distinguishing between similar elements and not necessarily for describing a particular sequential or chronological order. It is to be understood that the terms so used are interchangeable.

Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

With respect to any numerical range for a given characteristic, a parameter from one range may be combined with a parameter from a different range from the same characteristic to generate a numerical range. Other than where otherwise indicated, all numbers, values, and/or expressions referring to quantities of ingredients, reaction conditions, etc., used in the specification and claims are to be understood as modified in all instances by the term "about."

In this regard, while the described subject matter has been described in connection with various aspects and embodiments and corresponding Figures, where applicable, it is to be understood that other similar aspects and embodiments can be used or modifications and additions can be made to the described aspects and embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims.

What is claimed is:

1. A device, comprising:
   a switching converter comprising:
      a first switch and a second switch coupled in series with a source of electric potential; and
      an inductor having a first end coupled with a node between the first switch and the second switch, and a second end coupled with an output terminal;
   a capacitor coupled to the output terminal;
   a controller configured to coordinate the first switch and the second switch to accumulate energy at the inductor and deliver the energy to an output load, wherein the output load is regulated to a defined output voltage, wherein the controller comprises an adaptive duty ratio compensator configured to stabilize the switching converter, and wherein a response of the adaptive duty ratio compensator is adjusted during a detected load transient period;
   a first linear regulator configured to detect an output undershoot voltage, and to source a first current to the output load and the capacitor in response to detection of the output undershoot voltage, wherein the first linear regulator comprises:
      a first reference selection component, in communication with a first error amplifier, configured to select a first reference voltage that defines the output undershoot voltage, during an operation period that is different than the detected load transient period, or a second reference voltage higher than the first reference voltage, during the detected load transient period; and
      a first hysteretic load transient detector, coupled to the first reference selection component and the adaptive duty ratio compensator, configured to produce a first control signal that signifies a beginning and an ending of a first load transient period, wherein the first load transient period is defined by a value of a current of the first linear regulator being a first defined value higher than a first reference current or a second defined value lower than a second reference current; and
   a second linear regulator configured to detect an output overshoot voltage and to sink a second current of the output load and the capacitor in response to detection of the output overshoot voltage.

2. The device of claim 1, wherein the first switch is at least one of a bipolar transistor, a metal-oxide-semiconductor field-effect transistor, or a diode, and wherein the second switch is at least one of a bipolar transistor, a metal-oxide-semiconductor field-effect transistor, or a diode.

3. The device of claim 1, further comprising a third switch coupled in parallel with the inductor.

4. The device of claim 3, further comprising at least one of a diode or a resistor in series with the third switch.

5. The device of claim 1, wherein the source of electrical potential is at least one of connected between a positive supply voltage and a ground, between a positive supply voltage and a negative supply voltage, or between two different supply voltages of like polarity.

6. The device of claim 1, wherein the first linear regulator uses at least one of the source of electrical potential or a disparate source than the source of electrical potential as a power supply.

7. The device of claim 1, wherein the second linear regulator uses at least one of the source of electrical potential or a disparate source than the source of electrical potential as a power supply.

8. The device of claim 1, wherein the first linear regulator is constructed using at least one of a bipolar transistor or a metal-oxide-semiconductor field-effect transistor.

9. The device of claim 1, wherein the second linear regulator is constructed using at least one of a bipolar transistor or a metal-oxide-semiconductor field-effect transistor.

10. The device of claim 1, wherein the controller further comprises:
    a clock and ramp signal generator; and
    a logic processor and driver component configured to turn the first switch and the second switch on and off.

11. The device of claim 10,
    wherein the second linear regulator further comprises:
       a reference selection component, in communication with a second error amplifier, configured to select a third reference voltage that defines the output overshoot voltage, during the operation period, or a fourth reference voltage lower than the third reference voltage, during the detected load transient period; and
       a second hysteretic load transient detector, coupled to the reference selection component and the adaptive duty ratio compensator, configured to at least produce a second control signal that signifies a beginning and an ending of a second load transient period, wherein the second load transient period is defined by a value of a current of the second linear regulator being a third defined value higher than a third reference current or a fourth defined value lower than a fourth reference current.

12. The device of claim 1, wherein the second reference voltage of the first reference selection component is equal to a reference voltage that defines an output target voltage.

13. The device of claim 1, wherein the second linear regulator further comprises:
    a second reference selection component, in communication with a second error amplifier, configured to select a third reference voltage that defines the output overshoot voltage, during the operation period, or a fourth reference voltage lower than the third reference voltage, during the detected load transient period; and
    a second hysteretic load transient detector, coupled to the second reference selection component and the adaptive duty ratio compensator, configured to at least produce a second control signal that signifies a beginning and an ending of a second load transient period, wherein the second load transient period is defined by a value of a current of the second linear regulator being a third defined value higher than a third reference current or a fourth defined value lower than a fourth reference current.

14. The device of claim 13, wherein the fourth reference voltage is equal to a reference voltage that defines an output target voltage.

15. A device, comprising:
    a switching converter, comprising:
       a first switch and a second switch coupled in series with a source of electric potential; and
       an inductor having a first end coupled with a node that is between the first switch and the second switch;
    a capacitor coupled to the output terminal and a second end of the inductor;
    a controller that coordinates turning on and off of the first switch and the second switch to accumulate energy in the inductor and deliver the energy to an output load wherein the output load is regulated to a defined voltage, wherein the controller comprises an adaptive duty ratio compensator configured to stabilize the switching converter, and wherein a response of the adaptive duty ratio compensator is adjusted during a detected load transient period;

a first linear regulator that detects an output overshoot voltage and sinks a first current of the output load and the capacitor in response to a detection of the output overshoot voltage, wherein the first linear regulator comprises:

a first reference selection component, in communication with an error amplifier, configured to select a first reference voltage that defines the output overshoot voltage, during an operation period that is different than the detected load transient period, or a second reference voltage lower than the first reference voltage, during the detected load transient period; and a hysteretic load transient detector, coupled to the first reference selection component and the adaptive duty ratio compensator, configured to produce a first control signal that signifies a beginning and an ending of a first load transient period, wherein the first load transient period is defined by a value of a current of the first linear regulator being a first defined value higher than a first reference current or a second defined value lower than a second reference current; and a second linear regulator that detects an output undershoot voltage and source a current to the output load and the capacitor.

16. The device of claim 15, wherein the controller further comprises:
a clock and ramp signal generator; and
a logic processor and driver component that turns the first switch and the second switch on and off.

17. The device of claim 15, wherein the second reference voltage of the first reference selection component is equal to a reference voltage that defines an output target voltage.

18. A device, comprising:
a plurality of switch arrangements comprising a plurality of high side switches and a plurality of low side switches connected in series across a source of electrical potential and having a common connection coupled via a plurality of respective inductors to an output terminal;
a capacitor coupled to the output terminal;
a controller configured to coordinate the plurality of switch arrangements to accumulate energy at the plurality of respective inductors and deliver the energy to an output load, wherein the output load is regulated to a defined DC voltage, wherein the controller is configured to stabilize the plurality of switch arrangements, and wherein a response of the controller is adjusted during a detected load transient period;
a first linear regulator configured to detect an output undershoot voltage and source a first current to the output load and the capacitor, wherein the first linear regulator comprises:
a first reference selection component, in communication with a first error amplifier, configured to select a first reference voltage that defines the output undershoot voltage, during an operation period that is different than the detected load transient period, or a second reference voltage higher than the first reference voltage, during the detected load transient period; and a first hysteretic load transient detector, coupled to the first reference selection component and the controller, configured to produce a first control signal that signifies a beginning and an ending of a first load transient period, wherein the first load transient period is defined by a value of a current of the first linear regulator being a first defined value higher than a first reference current or a second defined value lower than a second reference current; and a second linear regulator configured to detect an output overshoot voltage and to sink a second current from the output load and the capacitor.

19. The device of claim 18, wherein the second linear regulator further comprises:
a second reference selection component, in communication with a second error amplifier, configured to select a third reference voltage that defines the output overshoot voltage, during the operation period, or a fourth reference voltage lower than the third reference voltage, during the detected load transient period; and a second hysteretic load transient detector, coupled to the second reference selection component and the adaptive duty ratio compensator, configured to at least produce the second control signal that signifies a beginning and an ending of a second load transient period, wherein the second load transient period is defined by a value of a current of the second linear regulator being a third defined value higher than a third reference current or a fourth defined value lower than a fourth reference current.

20. A method, comprising:
coordinating states of a plurality of switches associated with an inductor;
regulating an output load to a defined output voltage by accumulating energy at the inductor based on the coordinated states of the plurality of switches;
sensing a voltage of the output load;
in response to determining that the voltage of the output load satisfies a first function of an output undershoot voltage threshold, sourcing a first current to the output load and a capacitor that is coupled to an output terminal and the output load;
producing a first control signal that signifies a beginning and an ending of a detected load transient period, wherein a first load transient period is defined by a value of a current being a first defined value higher than a first reference current or a second defined value lower than a second reference current;
selecting a first reference voltage that defines the output undershoot voltage, during an operation period that is different than the detected load transient period, or a second reference voltage higher than the first reference voltage to cause an increased sourcing current, during the detected load transient period; and
altering a duty ratio associated with the inductor based on the first control signal associated with the output undershoot voltage.

21. The method of claim 20, further comprising:
in response to determining that the voltage of the output load satisfies a second function of an output overshoot voltage threshold, sinking a second current from the output load and the capacitor.

22. The method of claim 21, further comprising:
in response to determining that the voltage of the output load satisfies the third function of the steady state voltage, interrupting sourcing the first current.

23. The method of claim 21, further comprising:
in response to determining that the voltage of the output load satisfies the third function of the steady state voltage, interrupting sinking the second current.

24. A device, comprising:
a plurality of switch arrangements comprising a plurality of high side switches and a plurality of low side switches connected in series across a source of electrical potential and having a common connection coupled via a plurality of respective inductors to an output terminal;
a capacitor coupled to the output terminal;
a controller configured to coordinate the plurality of switch arrangements to accumulate energy at the plurality of respective inductors and deliver the energy to an output load, wherein the output load is regulated to a defined DC voltage, wherein the controller is configured to stabilize the plurality of switch arrangements, and wherein a response of the controller is adjusted during a detected load transient period;
a first linear regulator configured to detect an output overshoot voltage and source a first current to the output load and the capacitor, wherein the first linear regulator comprises:
a first reference selection component, in communication with a first error amplifier, configured to select a first reference voltage that defines the output overshoot voltage, during an operation period that is different than the detected load transient period, or a second reference voltage lower than the first reference voltage, during the detected load transient period; and
a first hysteretic load transient detector, coupled to the first reference selection component and the adaptive duty ratio compensator, configured to produce a first control signal that signifies a beginning and an ending of a first load transient period, wherein the first load transient period is defined by a value of a current of the first linear regulator being a first defined value higher than a first reference current or a second defined value lower than a second reference current; and
a second linear regulator configured to detect an output undershoot voltage and to source a second current to the output load and the capacitor.

25. The device of claim 24, wherein the second reference voltage is equal to a reference voltage that defines an output target voltage.

26. A method, comprising:
coordinating states of a plurality of switches associated with an inductor;
regulating an output load to a defined output voltage by accumulating energy at the inductor based on the coordinated states of the plurality of switches;
sensing a voltage of the output load;
in response to determining that the voltage of the output load satisfies a first function of an output undershoot voltage threshold, sourcing a first current to the output load and a capacitor that is coupled to an output terminal and the output load;
producing a first control signal that signifies a beginning and an ending of the detected load transient period, wherein a first load transient period is defined by a value of a current being a first defined value higher than a first reference current or a second defined value lower than a second reference current;
selecting a first reference voltage that defines the output undershoot voltage, during normal operation, or a second reference voltage higher than the first reference voltage to cause an increased sourcing current, during the detected load transient period; and
altering a duty ratio associated with the inductor based on the first control signal associated with the output undershoot voltage.

27. The method of claim 26, further comprising:
in response to determining that the voltage of the output load satisfies a second function of an output overshoot voltage threshold, sinking a second current from the output load and the capacitor.

* * * * *